US011112927B2

(12) United States Patent
Biswas et al.

(10) Patent No.: US 11,112,927 B2
(45) Date of Patent: Sep. 7, 2021

(54) DIGITAL CONTENT AUTOMATED LAYOUT SYSTEM

(71) Applicant: Adobe Inc., San Jose, CA (US)

(72) Inventors: Mainak Biswas, Noida (IN); Udit Gupta, Delhi (IN); Sanyam Jain, New Delhi (IN); Gaurav Bhargava, Noida (IN)

(73) Assignee: Adobe Inc., San Jose, CA (US)

( * ) Notice: Subject to any disclaimer, the term of this patent is extended or adjusted under 35 U.S.C. 154(b) by 146 days.

(21) Appl. No.: 15/962,656

(22) Filed: Apr. 25, 2018

(65) Prior Publication Data

US 2019/0332861 A1 Oct. 31, 2019

(51) Int. Cl.
| | |
|---|---|
| *G06F 3/0481* | (2013.01) |
| *G06F 3/0484* | (2013.01) |
| *G06F 40/154* | (2020.01) |
| *G06F 40/143* | (2020.01) |
| *G06K 9/00* | (2006.01) |

(52) U.S. Cl.
CPC .......... *G06F 3/0481* (2013.01); *G06F 3/0484* (2013.01); *G06F 40/143* (2020.01); *G06F 40/154* (2020.01); *G06K 9/00463* (2013.01)

(58) Field of Classification Search
CPC .............. G06K 9/00463; G06K 9/6282; G06F 40/154; G06F 40/117; G06F 40/106; G06F 40/14; G06F 3/0481; G06F 3/0484
See application file for complete search history.

(56) References Cited

U.S. PATENT DOCUMENTS

| | | | | |
|---|---|---|---|---|
| 6,144,974 A * | 11/2000 | Gartland | ................ | G06T 11/60 |
| | | | | 715/205 |
| 7,458,017 B2 * | 11/2008 | Chen | ..................... | G06F 16/958 |
| | | | | 715/234 |
| 8,091,036 B1 * | 1/2012 | Pavek | ...................... | G06F 8/38 |
| | | | | 358/1.18 |
| 8,489,984 B1 * | 7/2013 | Violet | ...................... | G06F 8/34 |
| | | | | 715/209 |
| 8,732,591 B1 * | 5/2014 | Mendes Da Costa | ...................... | |
| | | | | G06F 40/169 |
| | | | | 715/757 |
| 9,317,626 B2 * | 4/2016 | Chan | ...................... | G06N 3/126 |
| 10,078,626 B1 * | 9/2018 | Voskamp | .............. | G06F 40/106 |
| 2003/0067485 A1 * | 4/2003 | Wong | ..................... | H04L 67/36 |
| | | | | 715/747 |
| 2004/0148318 A1 * | 7/2004 | Taylor | ................... | G06F 16/958 |
| 2005/0071364 A1 * | 3/2005 | Xie | .................... | G06F 16/9577 |
| 2005/0094205 A1 * | 5/2005 | Lo | ......................... | G06F 40/174 |
| | | | | 358/1.18 |

(Continued)

*Primary Examiner* — Kieu D Vu
*Assistant Examiner* — Rami R Okasha
(74) *Attorney, Agent, or Firm* — FIG. 1 Patents

(57) ABSTRACT

Automated digital content layout systems and techniques are described. Interaction of a creative professional with a digital content design system to create a digital content design is monitored. The digital content design is created by the creative professional in accordance with a maximum amount of display area along a primary axis to be used to display the digital content design. The digital content design system then employs a layout system to generate a layout definition for inclusion as part of the digital content design that includes a set of rules to control how the items of digital content are arranged in a user interface in amounts of the display area along the primary axis that are less than this maximum amount.

20 Claims, 23 Drawing Sheets

(56) References Cited

U.S. PATENT DOCUMENTS

| | | | | |
|---|---|---|---|---|
| 2006/0150092 A1* | 7/2006 | Atkins | G06Q 10/043 | 715/251 |
| 2006/0150169 A1* | 7/2006 | Cook | G06F 8/10 | 717/156 |
| 2006/0200759 A1* | 9/2006 | Agrawala | G06F 40/103 | 715/209 |
| 2006/0279566 A1* | 12/2006 | Atkins | G06F 40/103 | 345/418 |
| 2007/0003166 A1* | 1/2007 | Berkner | G06K 9/00463 | 382/298 |
| 2007/0133842 A1* | 6/2007 | Harrington | G06K 9/036 | 382/112 |
| 2007/0168856 A1* | 7/2007 | Berkner | G06F 16/34 | 715/210 |
| 2007/0174291 A1* | 7/2007 | Cooper | G06F 9/451 | |
| 2007/0208996 A1* | 9/2007 | Berkner | G06F 40/106 | 715/210 |
| 2008/0109477 A1* | 5/2008 | Lue | G06F 16/9577 | |
| 2008/0229212 A1* | 9/2008 | Miyazaki | G06F 9/44505 | 715/744 |
| 2009/0051701 A1* | 2/2009 | Fleming | G06F 9/541 | 345/619 |
| 2009/0089660 A1* | 4/2009 | Atkins | G06F 40/106 | 715/243 |
| 2009/0144652 A1* | 6/2009 | Wiley | G06F 9/451 | 715/800 |
| 2009/0307583 A1* | 12/2009 | Tonisson | G06F 40/186 | 715/246 |
| 2010/0174977 A1* | 7/2010 | Mansfield | G06F 40/163 | 715/234 |
| 2012/0259859 A1* | 10/2012 | Ishigami | G06Q 30/0241 | 707/740 |
| 2013/0132042 A1* | 5/2013 | Chan | G06F 30/00 | 703/1 |
| 2013/0219263 A1* | 8/2013 | Abrahami | G06F 16/9577 | 715/234 |
| 2013/0305187 A1* | 11/2013 | Phillips | G06F 3/04842 | 715/800 |
| 2014/0013271 A1* | 1/2014 | Moore | G06F 3/0482 | 715/792 |
| 2014/0372874 A1* | 12/2014 | Marseille | G06F 40/174 | 715/243 |
| 2015/0012818 A1* | 1/2015 | Reichmann | G06F 3/04842 | 715/236 |
| 2015/0074516 A1* | 3/2015 | Ben-Aharon | G06F 40/186 | 715/234 |
| 2015/0346922 A1* | 12/2015 | Robertson | G06F 3/0482 | 715/765 |
| 2016/0048481 A1* | 2/2016 | Calvin | G06F 16/9577 | 715/234 |
| 2016/0179760 A1* | 6/2016 | Strong | H04N 21/8153 | 715/788 |
| 2016/0239163 A1* | 8/2016 | Singal | H04M 1/72586 | |
| 2016/0292134 A1* | 10/2016 | Elings | G06F 40/131 | |
| 2016/0328220 A1* | 11/2016 | Valtchev | G06F 8/34 | |
| 2016/0357712 A1* | 12/2016 | Zoon | G06F 40/106 | |
| 2017/0344656 A1* | 11/2017 | Koren | G06F 3/0484 | |
| 2018/0181375 A1* | 6/2018 | Hermet-Chavanne | G06F 8/38 | |
| 2018/0210864 A1* | 7/2018 | Zhang | G06F 40/30 | |
| 2019/0108201 A1* | 4/2019 | Abrahami | G06F 3/0482 | |
| 2019/0318212 A1* | 10/2019 | Govrin | G06K 9/00463 | |

* cited by examiner

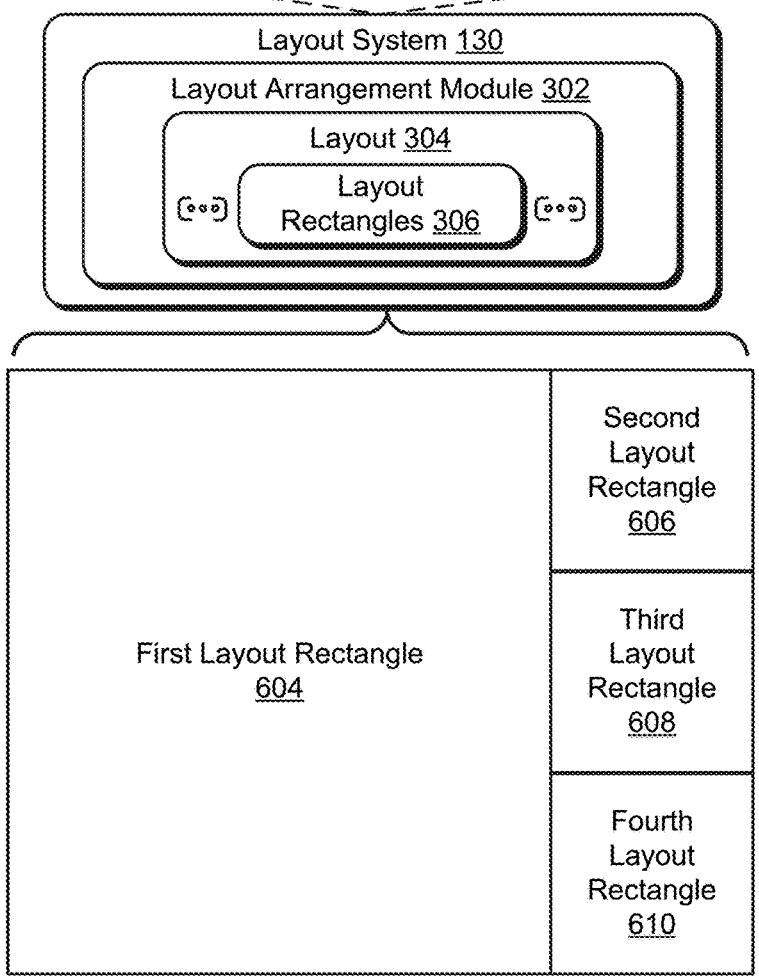
Fig. 9

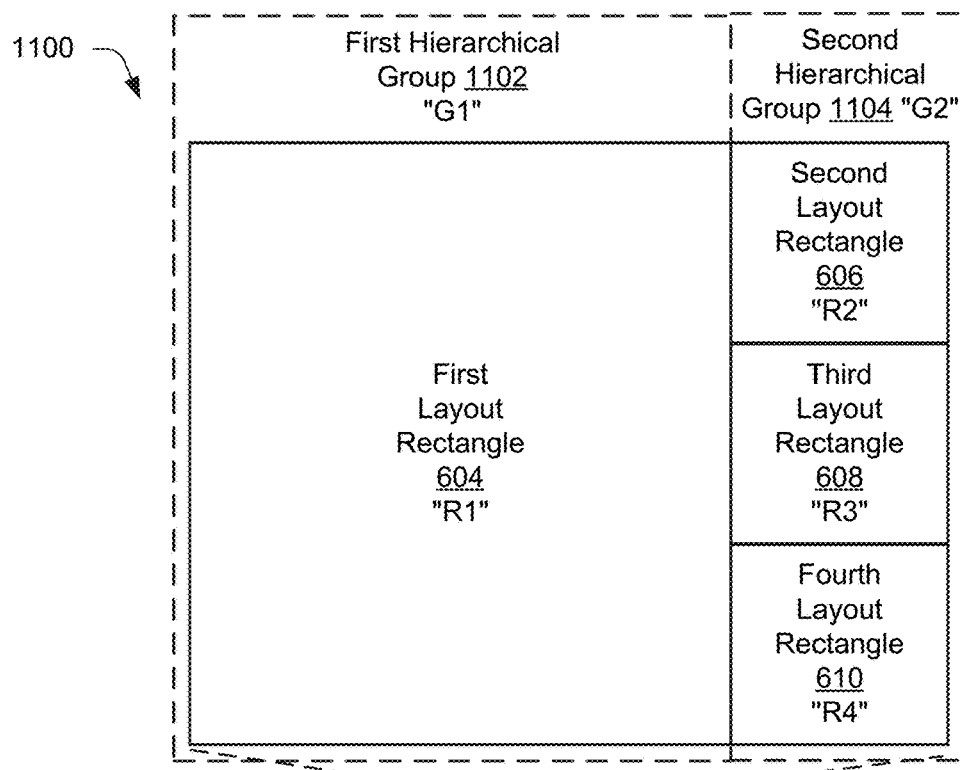
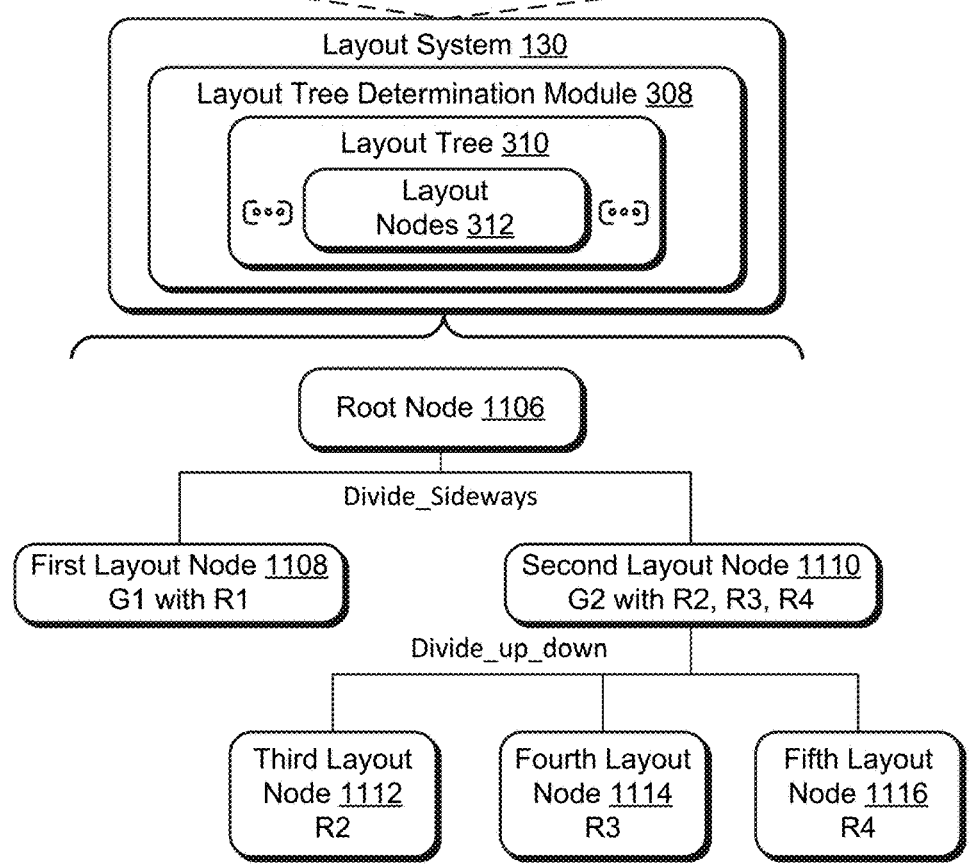
Fig. 11

DIGITAL CONTENT AUTOMATED LAYOUT SYSTEM

BACKGROUND

Digital layout creation systems are typically employed to create layouts for digital content designs to achieve a desired output in how digital content within the design is arranged with respect to each other. To do so using conventional techniques, creative professionals are tasked with creating a layout for each way in which the content may be output.

The digital content design, for instance, may be accessed in a variety of different ways, such as a webpage, blog, and so forth using a variety of different computing device configurations, e.g., desktop computer, a tablet, a mobile phone, a gaming device, and so forth. Therefore, a creative professional in conventional techniques is tasked with manually creating a digital content design for each of these different device configurations. This problem is further exacerbated by different orientations that may be employed by each of these configurations to display the digital content (e.g., portrait or landscape), differences in sizes and resolution of an available display area even within a particular computing device configuration (e.g., different window sizes), and so forth.

Accordingly, conventional techniques used to create digital content designs are inefficient both with respect to a creative professional that is tasked with creating the design as well as in use of computational resources of a computing device to assist in creating the designs. Further, output of conventional digital content designs may not be able to accurately address differences in computing device configurations, differences in orientations of display devices, as well as differences in size of the display devices thereby leading to less than optimal results in the real world.

SUMMARY

Automated digital content layout systems and techniques are described that overcome the challenges of conventional techniques to generate a "design once" digital content design that is usable across a wide range of computing device configurations. These techniques and systems support increased computational efficiency of a computing device and well as increased user efficiency in interacting with the computing device that incorporates these techniques. To do so, a creative professional interacts with a digital content design system to create a digital content design. The digital content design is created by the creative professional in accordance with a maximum amount of display area along a primary axis to be used to display the digital content design, e.g., a horizontal axis in a user interface. The digital content design system then employs a layout system to generate a layout definition for inclusion as part of the digital content design automatically and without user intervention that includes a set of rules to control how the items of digital content are arranged in a user interface based on amounts of the display area along the primary axis that are less than this maximum amount.

Layout rectangles are formed by the layout system as non-overlapping areas of the user interface based on bounding boxes. The layout system then generates a layout tree having layout nodes that describe an arrangement of hierarchical groupings of the digital content based on the layout rectangles. The layout system then proceeds through the layout rectangles to determine whether to employ a side-by-side arrangement or an up/down arrangement based on digital content included within the layout rectangles to form a decision tree. The decision tree is then converted to a layout definition by the layout system for inclusion as part of a digital content design, e.g., into a markup language such as XML, a cascading style sheet, and so on.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 9 depicts an example implementation of layout rectangles formed from a digital content design of FIG. 2.

FIG. 11 depicts an example implementation showing operation of a layout tree determination module of FIG. 3 to generate a layout tree as a hierarchical groupings of layout nodes.

DETAILED DESCRIPTION

Overview

Figure 1:
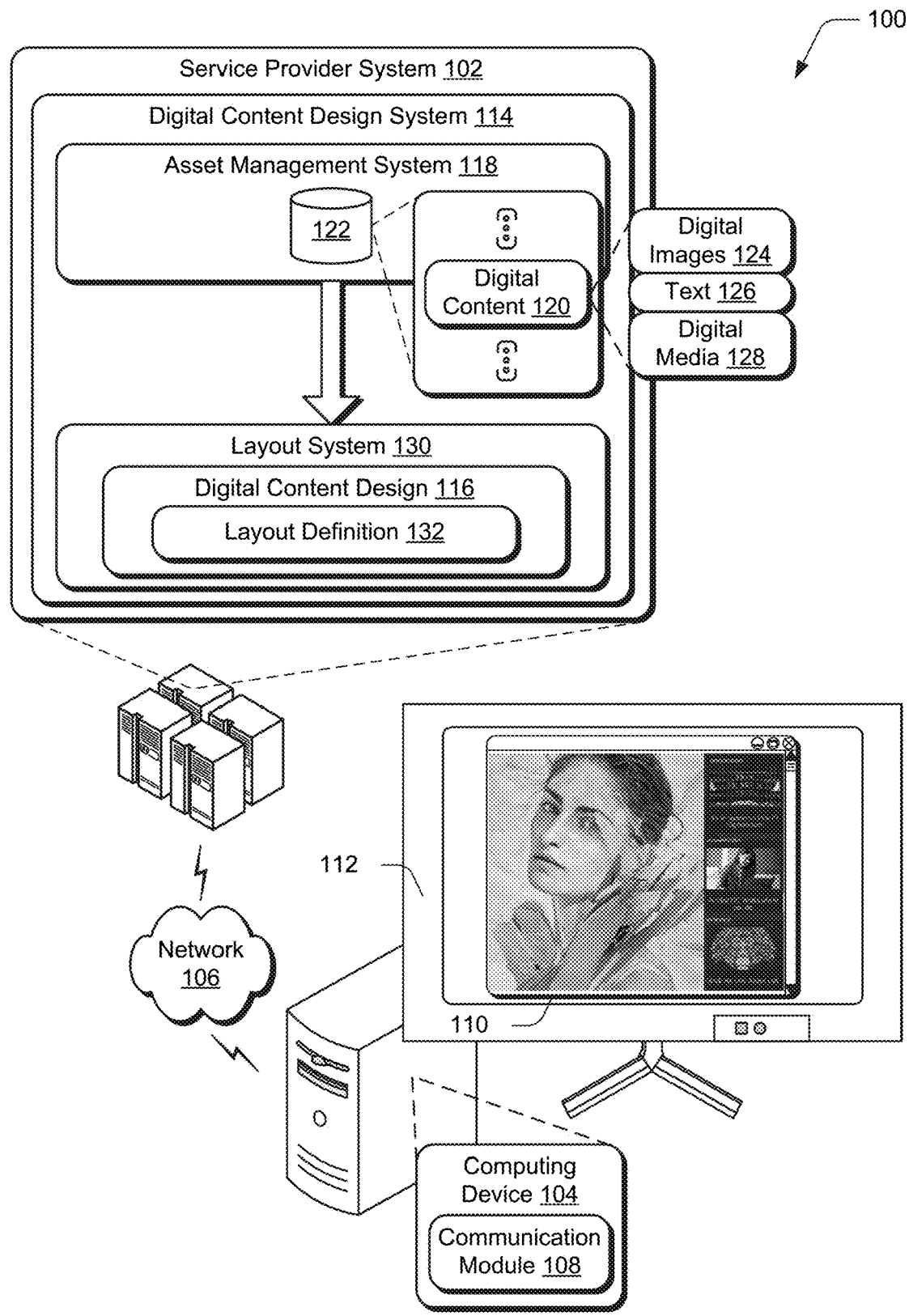
FIG. 1 is an illustration of an environment in an example implementation that is operable to employ automated digital content layout techniques described herein.

Automated digital content layout systems and techniques are described that overcome the challenges of conventional techniques to generate a "design once" digital content design that is usable across a wide range of computing device configurations. These techniques and systems support increased computational efficiency of a computing device and well as increased user efficiency in interacting with the computing device that incorporates these techniques. To do so, these techniques and systems overcome limitations of conventional techniques by addressing differences in how a digital content design may be displayed by a wide range of computing device configurations automatically and without user intervention both in creation and use of the design.

In one conventional example, a layout is specified as a page-level attribute that involves scaling and object-level fitting based on objects in relation to the page. Page-level attributes, for instance, scale content according to the page size in which a layout of the pages resizes as a window size is changed. This is accomplished by defining areas of the page using percentages instead of fixed pixel widths. As a result, this conventional example does not address a concept of adjacency of digital content in relation to each other in the layout, but rather resizes the page and objects within the page as a whole. Thus, one layout may not be suitable for use across different display device sizes in this conventional technique as the digital content may lack sufficient visibility in smaller configurations and/or may lack sufficient detail in larger configurations. Further, the creative professional is required to manually define constraints for each object on the page in this conventional technique, which is cumbersome and may require specialized knowledge.

Accordingly, an automated digital content layout system is described that overcomes these conventional challenges thereby improving both efficiency in user interaction as well as efficiency of a computing device that employs these techniques. In one example, a creative professional interacts with a digital content design system to create a digital content design. The digital content design is created by the creative professional in accordance with a maximum amount of display area along a primary axis to be used to display the digital content design, e.g., a horizontal axis in a user interface. The creative professional, for instance, may select, size, and arrange items of digital content, e.g., digital images, text, movies, for output in a desktop or television landscape orientation.

The digital content design system then employs a layout system to generate a layout definition for inclusion as part of the digital content design that includes a set of rules to control how the items of digital content are arranged in a user interface in amounts of the display area along the primary axis that are less than this maximum amount. To do so, the layout system generates bounding boxes around text and other graphical elements from the digital content included in the layout.

Layout rectangles are then formed by the layout system as non-overlapping areas of the user interface based on the bounding boxes. The layout system, for instance, may detect which of the bounding boxes overlap and merge these bounding boxes to form the layout rectangles that completely enclose these overlapping bounding boxes. Layout rectangles define portions of the digital content, within which, the content inside remains unchanged but the layout rectangles themselves may be rearranged in the user interface.

The layout system then generates a layout tree having layout nodes that describes an arrangement of hierarchical groupings of the digital content based on the layout rectangles. The hierarchical arrangement as described by the layout tree indicates arrangement and resizing of the layout nodes with respect to each other. This may include whether to employ a side-by-side arrangement of the items of digital content within a hierarchical grouping or an up/down arrangement of the items of digital content based on an available display area.

The layout system, for instance, may begin at a first point along a primary axis, e.g., a left or right end of a horizontal axis in a user interface. The layout system then proceeds through the layout rectangles to determine whether to first employ a side-by-side arrangement or an up/down arrangement based on digital content included within the layout rectangles. Once an end of the primary axis is reached, this process is repeated at a point further along a secondary axis, e.g., lower down a vertical axis to again examine layout rectangles along the primary axis.

In this way, a decision tree is generated that includes an arrangement of hierarchical groupings. The decision tree is then converted to a layout definition by the layout system for inclusion as part of a digital content design, e.g., into a markup language such as XML, a cascading style sheet, and so on. In this way, the digital content design may employ the layout definition as a set of rules to control arrangement of digital content included as part of the design, e.g., whether to employ an up/down or side-to-side arrangement of items of digital content within a hierarchical grouping.

The digital content design, for instance, may be received by a computing device, e.g., as a webpage, a blog, as a user interface screen in an application, a page in a digital document, and so on. A communication module is used to render the digital content. As part of this, the communication module examines rules at a root in a layout tree in the layout definition. The rules at the root node, for instance, may specify to arrange all the items in the top hierarchical grouping (e.g., each of the digital content items included in the digital content design) at a side-by-side arrangement if the available display area along the primary axis is greater than a threshold amount (e.g., a tablet width) or to switch to an up/down arrangement if the available display area is less than the threshold. This process may continue by the communication module using the layout definition further down the layout tree to further specify whether to use side-by-side or up/down arrangements of items of digital content within hierarchical groupings. In this way, the layout definition of the digital content design may respond to differences in computing device configurations, display device orientations, and even different window sizes via a single digital content design and layout definition, which is not possible using conventional techniques. Further, this may be performed by the computing device automatically and without user intervention, both to create and use of the layout definition. As a result, these techniques and systems support increased computational efficiency of a computing device and well as increased user efficiency in interacting with the computing device that incorporates these techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ automated digital content design techniques described herein. The illustrated environment 100 includes a service provider system 102 and a computing device 104 that are communicatively coupled, one to another, via a network 106. A variety of computing device configurations may be used to implement the service provider system 102 and/or computing device 104.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and as described in FIG. 24.

The computing device 104 is illustrated as including a communication module 108 that is configured to communicate and support interaction with the service provider system 102. The communication module 108, for instance, may be configured as a web browser, a network-enabled application, and so on to access a digital content design system 114 via the network 106. Although functionality to generate a digital content design system 114 usable to generate and implement a digital content design 116 is described in the following as implemented by the service provider system 102, this functionality may be implemented partially or as a whole by the computing device 104, e.g., through local execution by a processing system and computer-readable storage media. The computing device 104 is also illustrated as including a user interface 110 as rendered by a display device 112 that supports user interaction, e.g., through use of a cursor control device, spoken utterances, touchscreen functionality, through use of a natural user interface, and so forth.

The digital content design system 114 is further illustrated as including an asset management system 118. The asset management system 118 is representative of functionality to maintain, manage, and distribute digital content 120, which is illustrated as stored by a storage device 122. Digital content 120 may take a variety of forms, such as digital images 124, text 126, digital media 128 (e.g., vector graphics, illustrations, digital videos, digital audio), and so forth. Although illustrated included as part of the digital content design system 114, this functionality may also be incorporated separately (e.g., remotely) from the system. Further, the asset management system 118 may be representative of one of a plurality of different digital content sources that are usable to form a digital content design 116, and thus may also be implemented by the computing device 104, itself.

The digital content design system 114 also includes a layout system 130 that is configured to generate and maintain a digital content design 116 having a layout definition 132. The layout definition 132 is configured to control arrangement of digital content 120 included as part of the digital content design 116 based on an amount of display area that is available in a user interface along a primary and secondary axis. Further, the layout definition 132 is generated by the layout system 130 automatically and without user intervention based on a single instance of a digital content design. Accordingly, a creative professional may interact with the digital content design system 114 to create a single digital content design 116 having a layout definition 132 that is usable to support arrangement of digital content 120 with respect to a variety of differences in computing device configurations, display device orientations, and even different window sizes.

Figure 2:
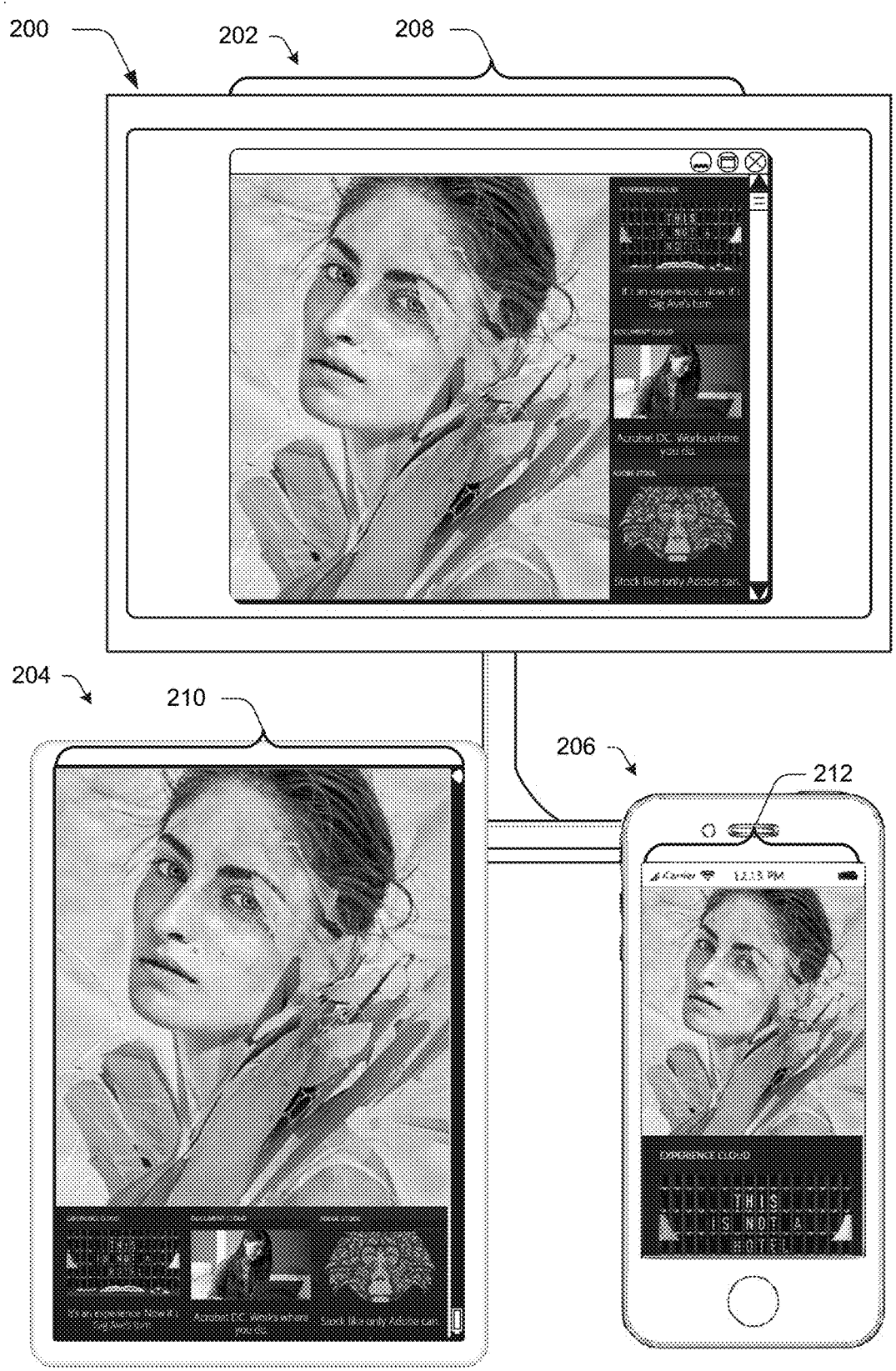
FIG. 2 depicts an example implementation showing display of a digital content design of FIG. 1 as supporting differing arrangements of digital content based on a layout definition included as part of the design.

FIG. 2 depicts an example implementation 200 showing display of the digital content design 116 of FIG. 1 as supporting differing arrangements and sizing of digital content 120 based on a layout definition 132 included as part of the design. Examples configurations of the computing device 104 are shown as supporting a desktop configuration 202, a tablet configuration 204, and a mobile phone configuration 206.

As previously described, each of these configurations may include different amounts of available display area, e.g., in "X" (i.e., horizontal) and "Y" (i.e., vertical) axes. Additionally, each of these configurations may also support different orientations, such as landscape for the desktop configuration 202 and portrait for the tablet and mobile phone configurations 204, 206. Further, these configurations may also support different window sizes within these orientations. Accordingly, a digital content design 116 may be confronted with a multitude of different output options, which conventionally required manual creation of different layouts, which is inefficient and inaccurate both to the creative professional as well as computing devices that implement these techniques.

In the techniques described herein, however, the layout definition 132 of the digital content design 116 is generated automatically and without user intervention, which may then be used to control arrangement of items of digital content 120 included as part of the design. To do so in one example, a creative professional creates a digital content design 116 including items of digital content 120 as arranged in accordance at a maximum desired amount of display area along a primary axis. The primary axis, for instance, may be chosen as a horizontal axis that permits continuous expansion and growth along a secondary vertical axis that is perpendicular to the primary axis as is typically found in webpages, blogs, and so forth. Other examples are also contemplated, such as to specify the primary axis as a vertical axis and the secondary axis as a horizontal axis.

In the illustrated example, a creative professional interacts with the digital content design system 114 to arrange items of digital content 120 as corresponding to the desktop configuration 202, which is the widest configuration along the primary horizontal access in this example. The digital content design system 114 then generates a layout definition 132 from this design that is usable to control arrangement of the items of digital content 120 for configurations having decreasing amounts of available display area along this primary axes. In this way, the layout definition 132 of the digital content design 116 may be used by a computing device 104 to arrange and render the items of digital content 120 based on an available display area along this primary axis automatically and without user intervention, which is not possible using conventional techniques. Further discussion of these and other examples is included in the following sections and is shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Content Design System

Figure 3:
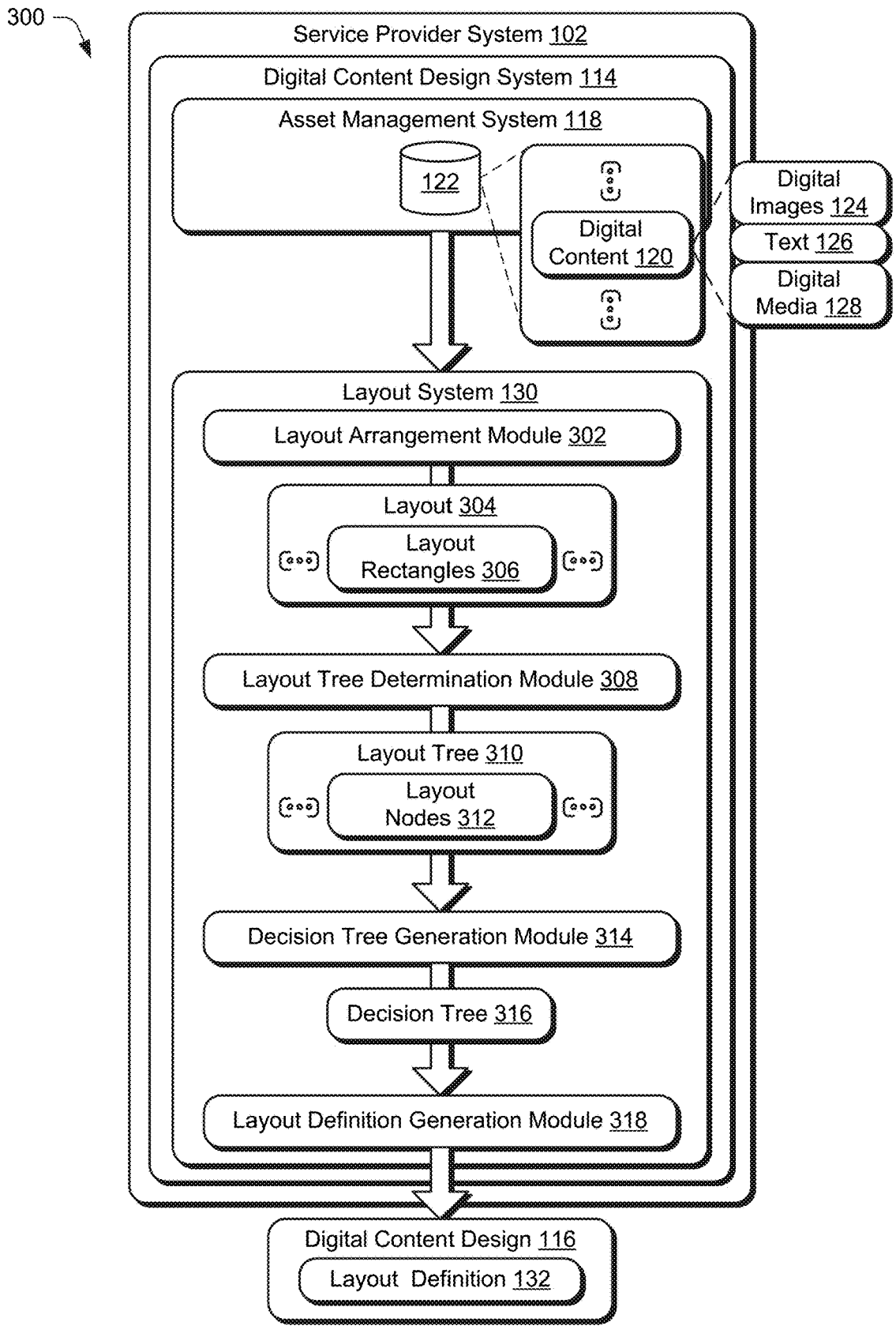
FIG. 3 depicts a system in an example implementation showing operation of a digital content design system of FIG. 1 in greater detail as generating a layout definition as part of a digital content design that is usable to control arrangement of items of digital content included as part of the design.
Figure 4:
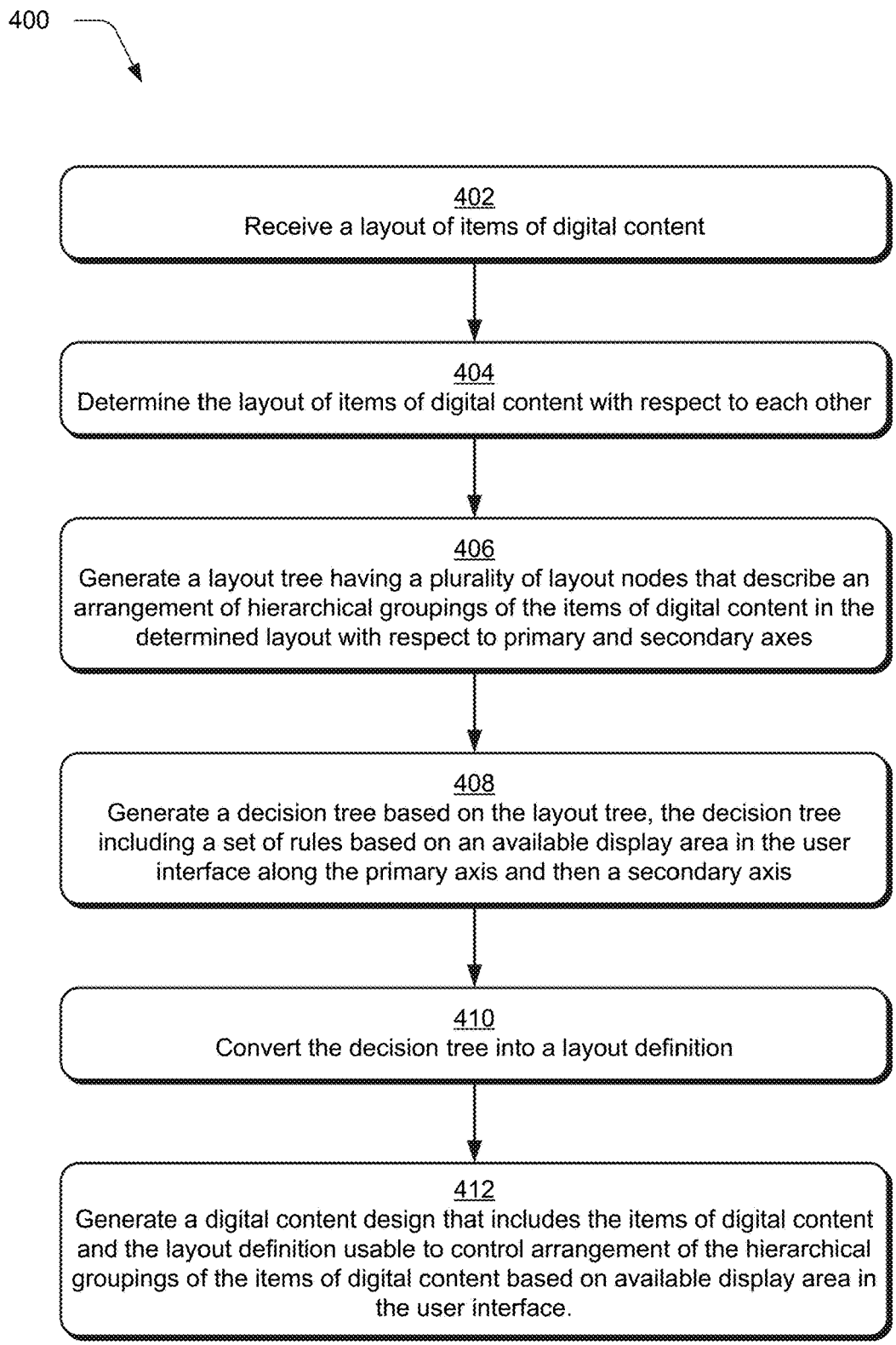
FIG. 4 is a flow diagram depicting a procedure in an example implementation in which a digital content design includes a layout definition that is generated automatically and without user intervention to control arrangement of items of digital content within hierarchical groupings.

FIG. 3 depicts a system 300 in an example implementation showing operation of the digital content design system 114 of FIG. 1 in greater detail as generating a layout definition as part of a digital content design that is usable to control arrangement of items of digital content included as part of the design. FIG. 4 depicts a procedure 400 in an example implementation in which a digital content design includes a layout definition that is generated automatically and without user intervention to control arrangement of items of digital content within hierarchical groupings.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 3-4 and continues throughout the remaining figures.

To begin, a layout of items of digital content is received (block 402) by the digital content design system 114. A creative professional, for instance, may interact with an asset management system 118 to select and arrange items of digital content 120 to form a layout of the digital content design 116. To do so, the layout system 130 may include a user interface 110 that is configured to interact with an asset management system 118 in a non-modal manner "within" a user interface of the layout system 130 to select from collections of digital content 120. In this way, the user interface increases efficiency by not "switching back and forth" between user interfaces as required in modal techniques. An example of this is Adobe® InDesign® as interacting with Adobe® Experience Manager®. The asset management system 118 includes digital content 120, which may take a variety of forms, such as digital images 124, text 126, digital media 128 such as illustrations, digital video, digital audio, and so on.

An input may then be received by the layout system 130 from the creative professional to generate a layout definition 132 for a digital content design 116 that is usable to control arrangement and/or resizing of items of digital content with respect to each other. Thus, the layout definition 132 may employ a notion of "adjacency" of the digital content 120 with respect to each other, which is not possible using conventional techniques.

A layout arrangement module 302, for instance, may determine a layout 304 of items of digital content with respect to each other (block 404) as arranged by the creative profession, the determination made using layout rectangles 306. The layout 304, for instance, is defined as a set of layout rectangles 306, which are non-overlapping in both "X" and "Y" axes with respect to each other. Layout rectangles 306 may have touching edges, but do not share a common area in this example.

Accordingly, the layout 304 may be defined as having an "N" number of layout rectangles 306 that follow "$X^i$," "$Y^i$," "$W^i$," "$H^i$," where "i" varies from "1, 2, . . . , N." In this notation, "$X^i$," "$Y^i$," "$W^i$," "$H^i$," respectively denote a top left corner position for the "i-th" rectangle with "$X^i$, $Y^i$," specifying the width and height for the "i-th" rectangle. Naturally, other representations, orderings, and definitions may also be employed for the layout rectangles 306. Given a single layout of the items of digital content 120 as received by the layout system 130, the layout system 130 is configured to generate a layout definition 132 that is usable to control arrangement and sizing of the items of digital content based on an available display area, e.g., along a primary axis.

Figure 5:
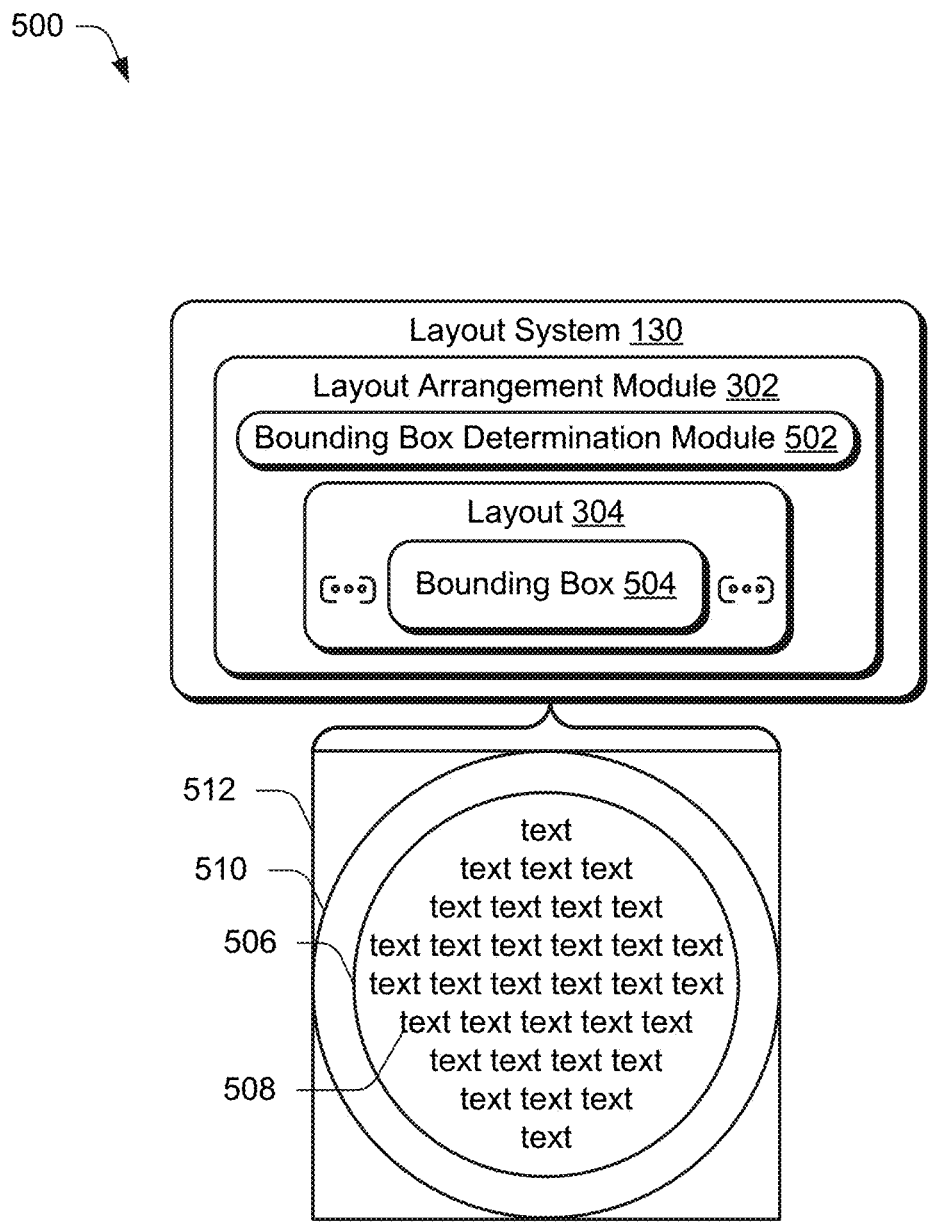
FIG. 5 depicts a system showing operation of a layout arrangement module of FIG. 3 in greater detail as generating bounding boxes.

As shown in the example system 500 of FIG. 5 depicting operation of the layout arrangement module 302 in greater detail, a bounding box determination module 502 is used to define bounding boxes 504 of graphical elements in the layout 304 received by the system. The bounding box determination module 502, for instance, may fit a border 506 to a graphical element 508 ("text" in the illustrated example), and padding 510 around that border for an non-rectangular element. A bounding box 512 is then fit as a rectangle that includes the padding as encompassed within the rectangle. This may be performed for each graphical element located in the digital content 120 used in the layout 304.

Figure 6:
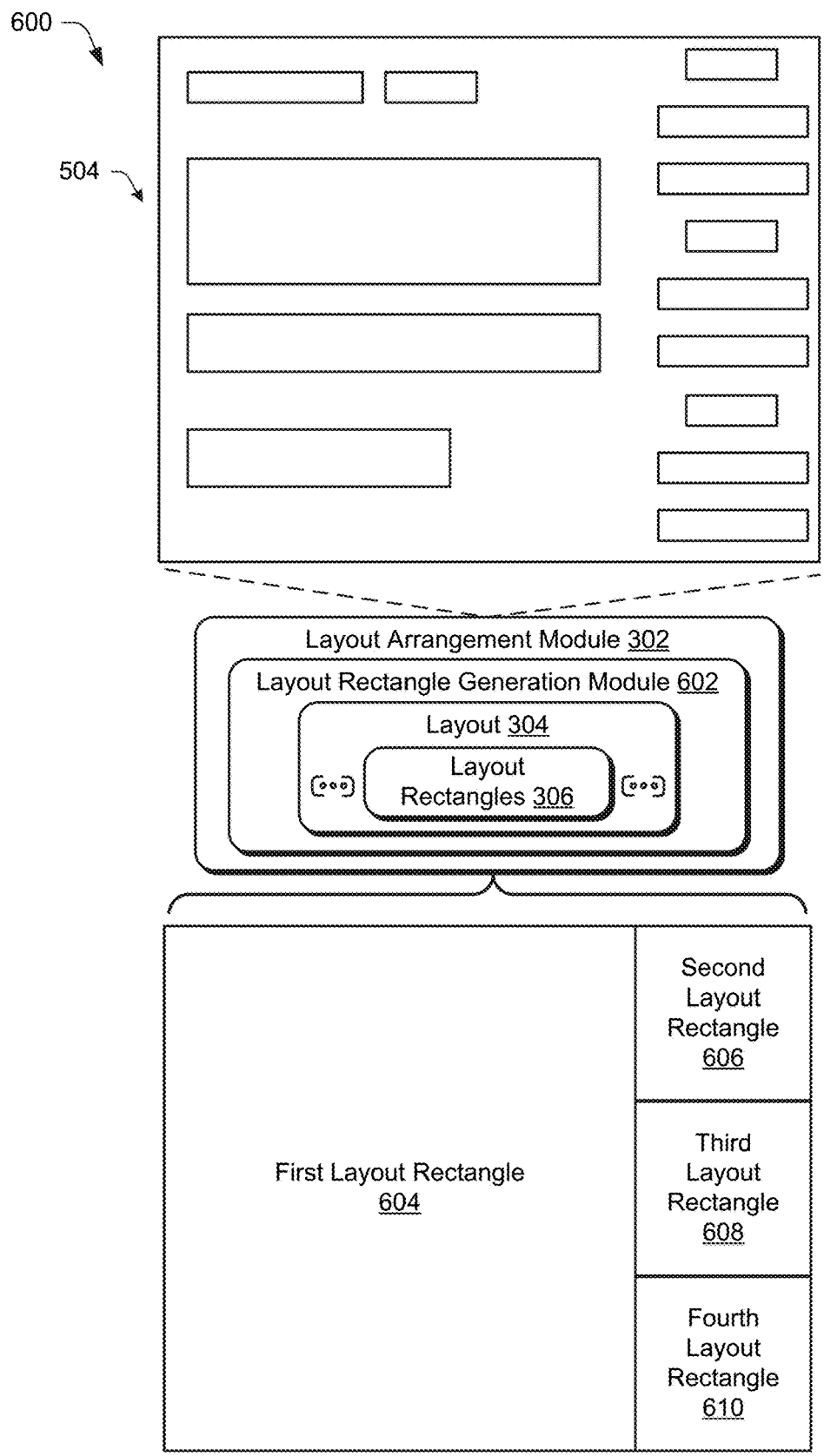
FIG. 6 depicts a system showing operation of a layout arrangement module of FIG. 3 in greater detail as generating layout rectangles from the bounding boxes of FIG. 5.

Referring now to FIG. 6, an example system is depicted showing operation of the layout arrangement module 302 of FIG. 3 in greater detail as generating layout rectangles 306 from the bounding boxes of FIG. 5. A layout rectangle generation module 602, for instance, may receive the bounding boxes 504 formed as described above. As illustrated, a layout 304 may include a plurality of graphical elements, each with their own bounding box 504. So, in order to generate the layout rectangles 306, the layout rectangle generation module 602 merges each of the bounding boxes which share a common area in the user interface (i.e., overlap) into a single rectangular area. The bounding boxes 504, for instance, may be merged to form first, second, third, and fourth layout rectangles 604, 606, 608, 610.

Figure 7:
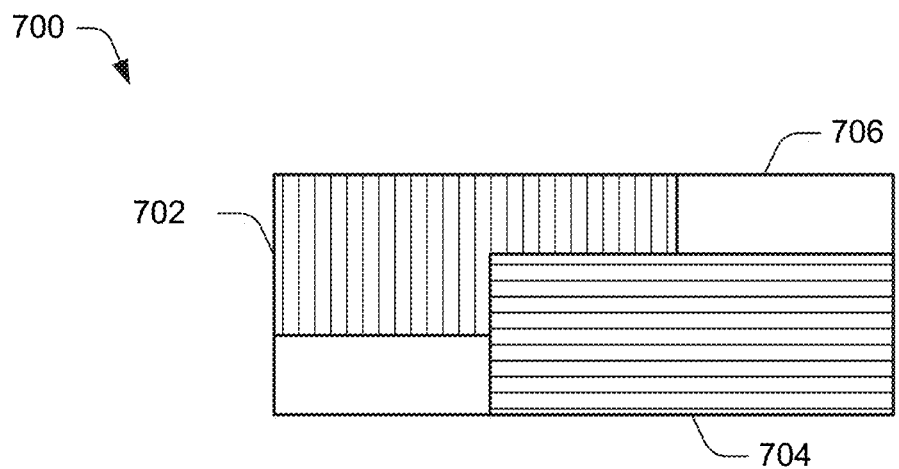
FIGS. 7 and 8 depict examples of merger of bounding boxes to form layout rectangles.
Figure 8:
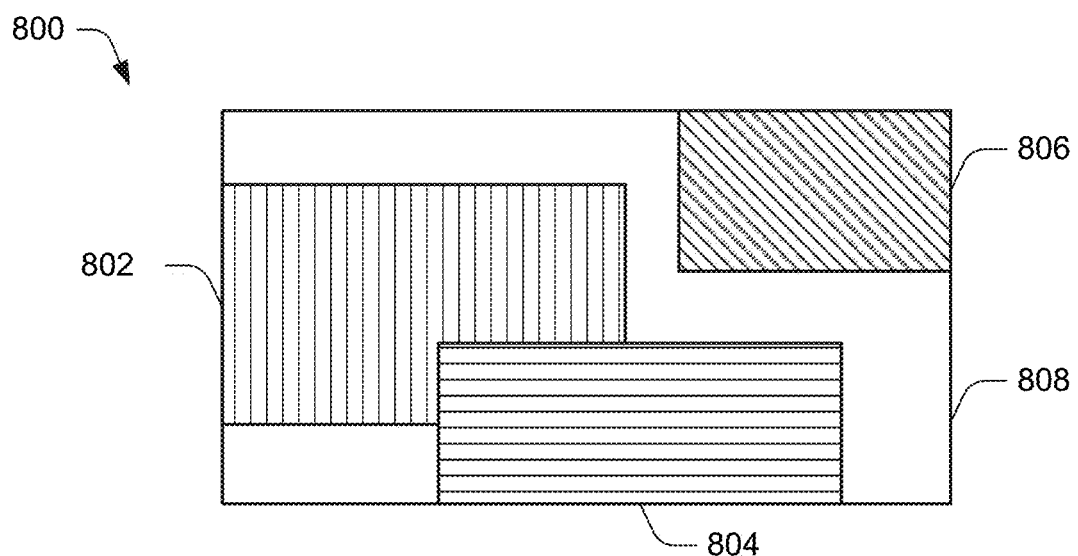

As shown in the example implementation 700 of FIG. 7 first and second bounding boxes 702, 704 overlap each other. Accordingly, a layout rectangle 706 is formed by the layout rectangle generation module 602 that encompasses both boxes. In the example implementation 800 of FIG. 8, first, second, and third bounding boxes 802, 804, 806 are merged in succession for inclusion in a layout rectangle 808. The layout rectangle generation module 602, for instance, may first merge the first and second bounding boxes 802, 804 to form a layout rectangle that also includes part of the third bounding box 806, e.g., the lower left corner. Accordingly, the layout rectangle generation module 602 may further expand the layout rectangle 808 to also include an entirety of the third bounding box 806. Thus, as shown in an example implementation 800 of FIG. 8, a layout 304 of digital content items, and graphical elements included within those items, may be used as a basis to generate the first, second, third, and fourth layout rectangles 604, 606, 608, 610. FIG. 9 depicts an example implementation 900 of layout rectangles 604-610 formed from a digital content design of FIG. 2.

Figure 10:
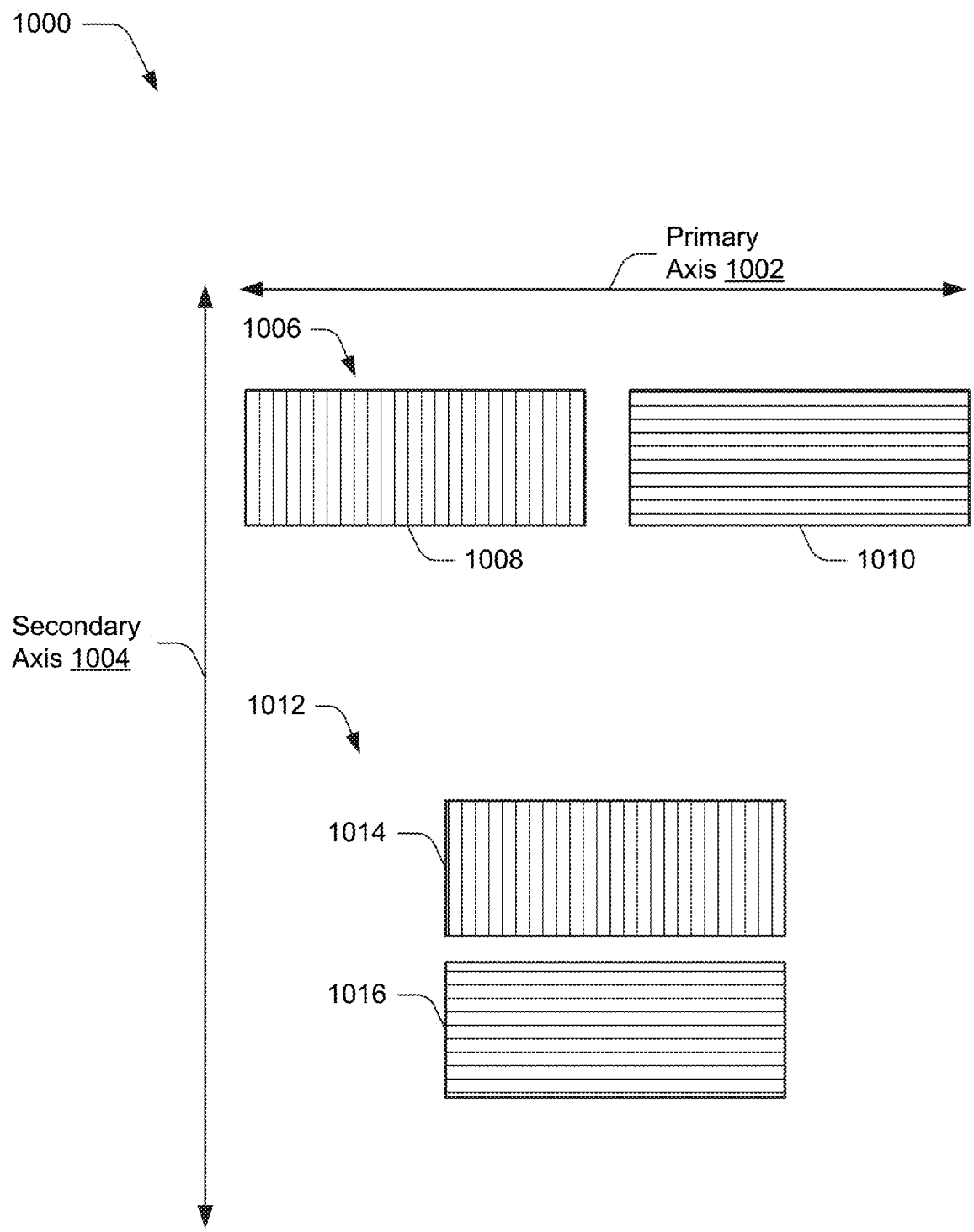
FIG. 10 depicts examples of a side-by-side technique and an up/down technique used to define adjacency of bounding boxes with respect to each other.

Return will now be made again to FIG. 3, the layout 304 and layout rectangles 306 are then received by a layout tree determination module 308 and used to generate a layout tree 310. The layout tree 310 has a plurality of layout nodes 312 that describe an arrangement of hierarchical groupings of the items of digital content 120 in the determined layout 304 with respect to primary and secondary axes (block 406). As shown in the example implementation 1000 of FIG. 10, for instance, a primary axis 1002 is defined as a horizontal axis in a user interface and a secondary axis 1004 is defined as a vertical axis that is perpendicular to the primary axis 1002 in the illustrated example. A relationship of layout rectangles with relation to each other with respect to first the primary axis 1002 and then the secondary axis 1004 is used to define arrangement of the blocks with respect to each other. A side-to-side arrangement 1006 is illustrated for first and second layout rectangles 1008, 1010 as defined along the primary axis 1002. An up/down arrangement 1012 is illustrated for the third and fourth 1014, 1016 layout rectangles. This may be used, for instance, to determine when to switch from a side-by-side arrangement as defined for the primary axis 1002 to an up/down arrangement as defined for the secondary axis 1004 and vice versa as further described in the following discussion.

FIG. 11 depicts an example implementation 1100 showing operation of the layout tree determination module 308 to generate a layout tree 310 as a hierarchical groupings of layout nodes 312. The layout tree determination module 308 forms the layout tree 310 based on arrangement of the layout rectangles initially with respect to a primary axis and then with respect to a secondary axis.

In the illustrated example, this causes a first layout rectangle 604 "R1" to be examined first and included within a first hierarchical group 1102 "G1." The layout tree determination module 308 then continues along the primary axis (e.g., horizontally) and reaches a second hierarchical group 1104 "G2," which includes a second layout rectangle 606 "R2," a third layout rectangle 608 "R3," and a fourth layout rectangle 610 "R4."

The layout tree determination module 308 generates the layout nodes 312 to describe arrangements of digital content within hierarchical groupings based on an amount of display area available in a user interface along the primary axis. To do so, the set of layout rectangles is first formed into hierarchical groupings, e.g., the first hierarchical grouping 1102, and the second hierarchical grouping 1104. These hierarchical groupings are then recursively subdivided into further hierarchical groupings of the layout rectangles by the layout tree determination module 308, which is represented as a layout tree 310 having layout nodes 312.

A variety of techniques may be utilized to form the hierarchical groupings of the items of digital content within the layout nodes 312 based on the layout rectangles. The layout tree determination module 308, for instance, may first arrange the layout rectangles into hierarchical groupings. To do so, let a set of layout rectangles 306 be defined as follows:

$$S = (Ri \text{ for } I=1 \ldots N)$$

in which "Ri" is the "i-th" layout rectangle defined by (Top_Left_Xi, Top_Left_Yi, Width_i, Height_i).

In order to implement a "divide_up_down" technique for a set of layout rectangles "SR," the following is performed:
1. Let a set of tuples be S.
2. For each Ri in SR
   a. Insert into S Tuples (Top_Left_Yi, Ri, type:start) and (Top_Left_Yi+Height_i, Ri, type:end)
3. Sort S according to first value in tuple, thereby giving a scan order of a top and bottom edge of each rectangle in set SR
4. For each tuple T in sorted S:
   a. If type is start increment a count by 1
   b. If type is end decrement count by 1
   c. If count reaches zero, then the set of rectangles found after count was 0 last time forms a group. Let this group be G.
   d. If G contains more than 1 rectangle, recursively call "Divide_sideways(G)."

In order to implement a "divide_sideways" technique for a set of layout rectangles "SR," the following is performed:
1. Let a set of tuples be S
2. For each Ri in SR
   a. Insert into S Tuples (Top_Left_Yi, Ri, type:start) and (Top_Left_Yi+Width_i, Ri, type:end)
3. Sort S according to first value in tuple, thereby giving a scan order of a top and bottom edge of each rectangle in set SR
4. For each tuple T in sorted S:
   a. If type is start increment a count by 1
   b. If type is end decrement count by 1
   c. If count reaches zero, then the set of rectangles found after count was 0 last time forms a group. Let this group be G.
   d. If G contains more than 1 rectangle, recursively call "Divide_up_down(G)."

In the illustrated example, a root node 1106 is first defined that includes the first and second hierarchical groups 1002, 1004. First and second layout nodes 1108, 1110 are then arranged in the layout tree 310 as children of the root node 1106. The first layout node 1108 includes the first layout rectangle 604 "R1." Third, fourth, and fifth layout nodes 1112, 114, 116 are then arranged as children of the second layout node 1110 that includes respective items of digital content "R2," "R3," and "R4."

In this example above, the layout tree determination module 308 first performs the up/down technique and then divides by a side-by-side technique. The reason for this is that the input layout as arranging the items of digital content is configured for its largest display size along the primary axis, which is horizontal in this example. Therefore, this results in a responsive design in that items that are adjacent sideways tend to also be adjacent when arranged up/down. If divide-sideways is performed first, results may be achieved in which adjacency is not maintained because this departs from the "maximum size" layout, thereby resulting in a layout that lacks a natural ordering.

Hierarchical groupings are generated by the layout tree determination module 308 to determine a set of layout rectangles 306 that are to be arranged together, and thus supports adjacency which is not possible using conventional techniques. This is performed by addressing both primary and secondary axes. Dividing on the bases of a single axis, e.g., X coordinates or Y coordinates, can result in groupings that when moved together result in bad layouts.

Figure 12:
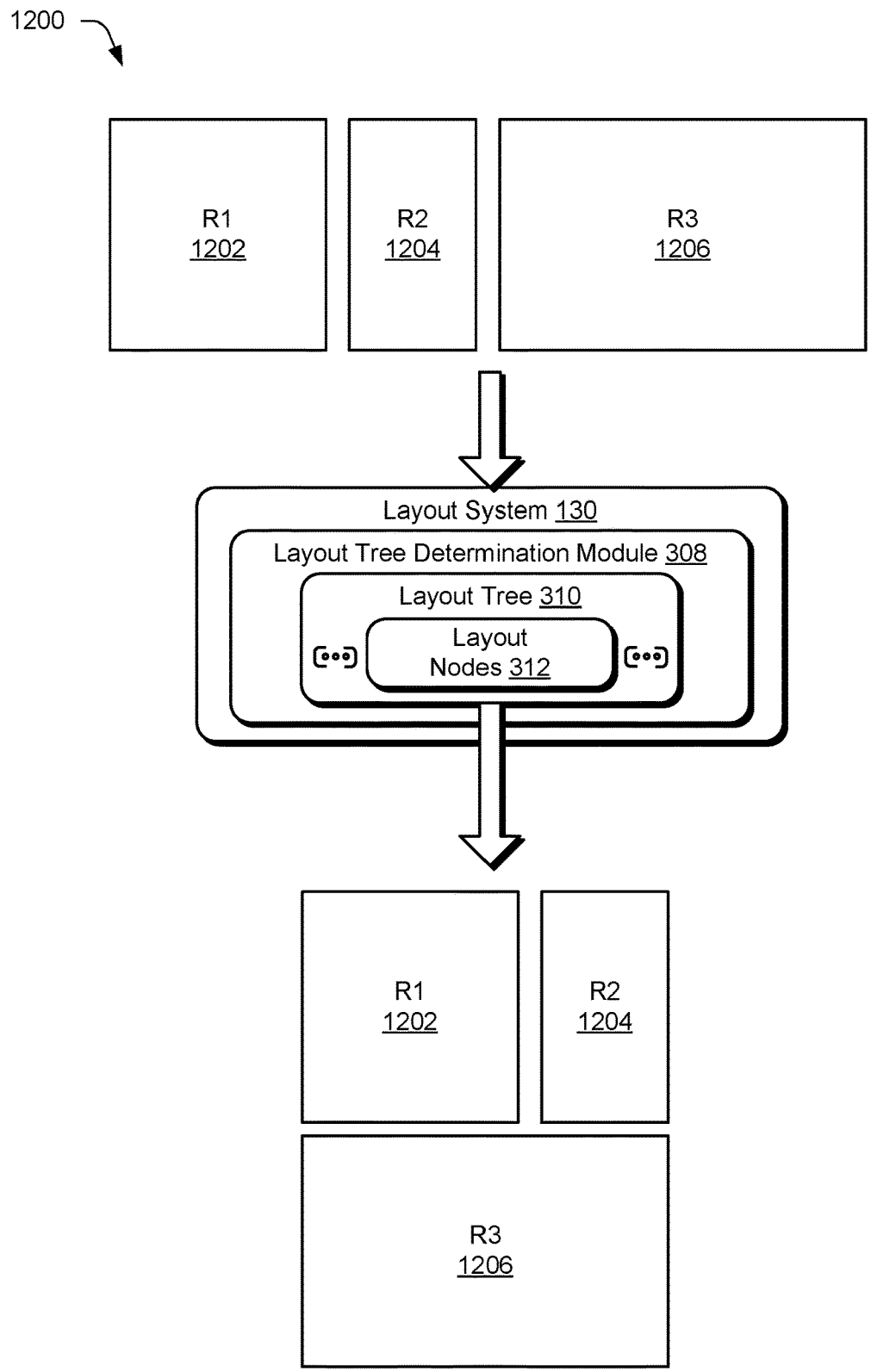
FIG. 12 depicts an example implementation of formation of hierarchical groupings of layout rectangles to form a layout tree.

FIG. 12 depicts an example implementation 1200 of formation of hierarchical groupings of layout rectangles to form the layout tree 310 as having layout nodes 312 that correspond to the rectangles. In this example, three layout rectangles are input as having different sizes, which are denoted as "R1" 1202, "R2" 1204, and "R3" 1206. If these layout rectangles were to be divided horizontally into three separate items, then when a switch to an up/down arrangement mode may achieve an undesirable result.

Accordingly, the layout tree determination module 308 in this example takes into account an amount of display area consumed by these layout rectangles with respect to both primary and second axes, e.g., horizontal and vertical axes, respectively. To do so, the module employs post processing to initially formed hierarchical groupings. If items of digital content included in the hierarchical grouping are arranged along a primary axis (e.g., horizontally or "sideways"), then the item of digital content that consumes the greatest amount of a display area along the primary axis is located, e.g., has a maximum width. Adjacent items of digital content are then merged until a total amount of the display area consumed by these items falls within a tolerance range compared with the maximum width. All such possible mergers of adjacent items of digital content are included in this hierarchical grouping.

If items of digital content included in the hierarchical grouping are arranged along a secondary axis (e.g., vertically or up/down), then the item of digital content that consumes the greatest amount of a display area along the secondary axis is located, i.e., that has a maximum height. Adjacent items of digital content are then also merged until a total amount of the display area consumed by these items falls within a tolerance range compared with maximum height. Each of the possible mergers of adjacent items of digital content are included in this hierarchical grouping.

Figure 13:
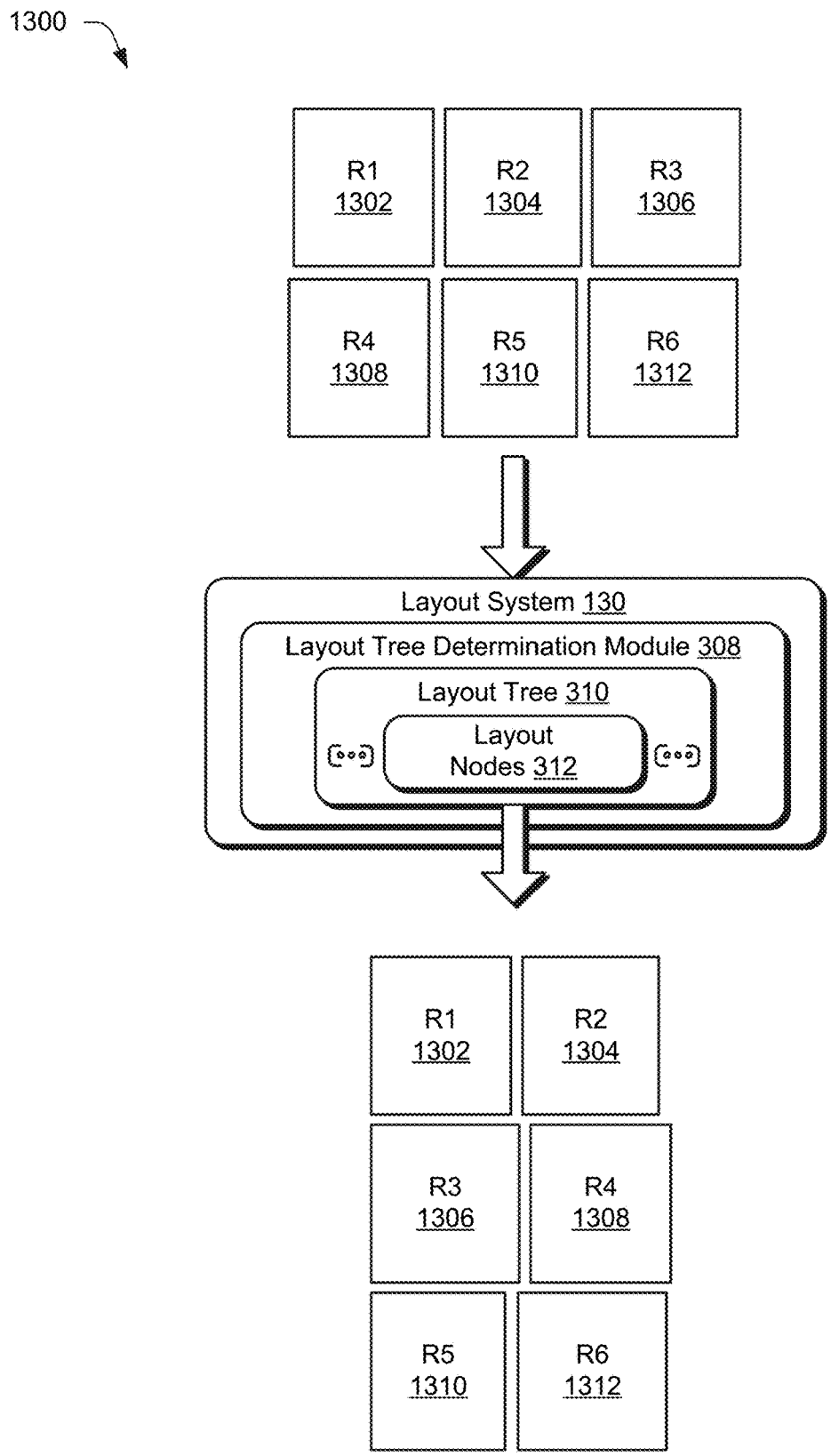
FIG. 13 depicts an example implementation in which a layout tree determination module generates combination layout nodes.

FIG. 13 depicts an example implementation 1300 in which the layout tree determination module 308 generates combination layout nodes 312. In this example, in "Divide_up_down," the layout rectangles "R1" 1302, "R2" 1304, "R3" 1306, "R4" 1308, "R5" 1310, and "R6" 1312 are arranged into two hierarchical groupings, e.g., ("R1" 1302, "R2" 1304, "R3" 1306) and ("R4" 1308, "R5" 1310, "R6" 1312).

The layout tree determination module 308 then compares adjacent groupings along the secondary axis, i.e., vertically. If these groupings have the same number of items of digital content, the amount that each item consumes along the primary axis (i.e., it's width) is compared to others in the group. When this width is within a tolerance range, the items are combined into a single hierarchical grouping. In the illustrated example, the layout tree determination module 308 determines that a single group of six layout rectangles are arranged in three combinations. For such hierarchical groupings having combinations, a decision is then made by the decision tree generation module 314 as to which combination number is to be employed for this group of layout rectangles to generate rules that specify whether to employ side-to-side or up/down arrangements. As illustrated, this may result in a decision to display these six items of digital content in combinations of two.

Figure 14:
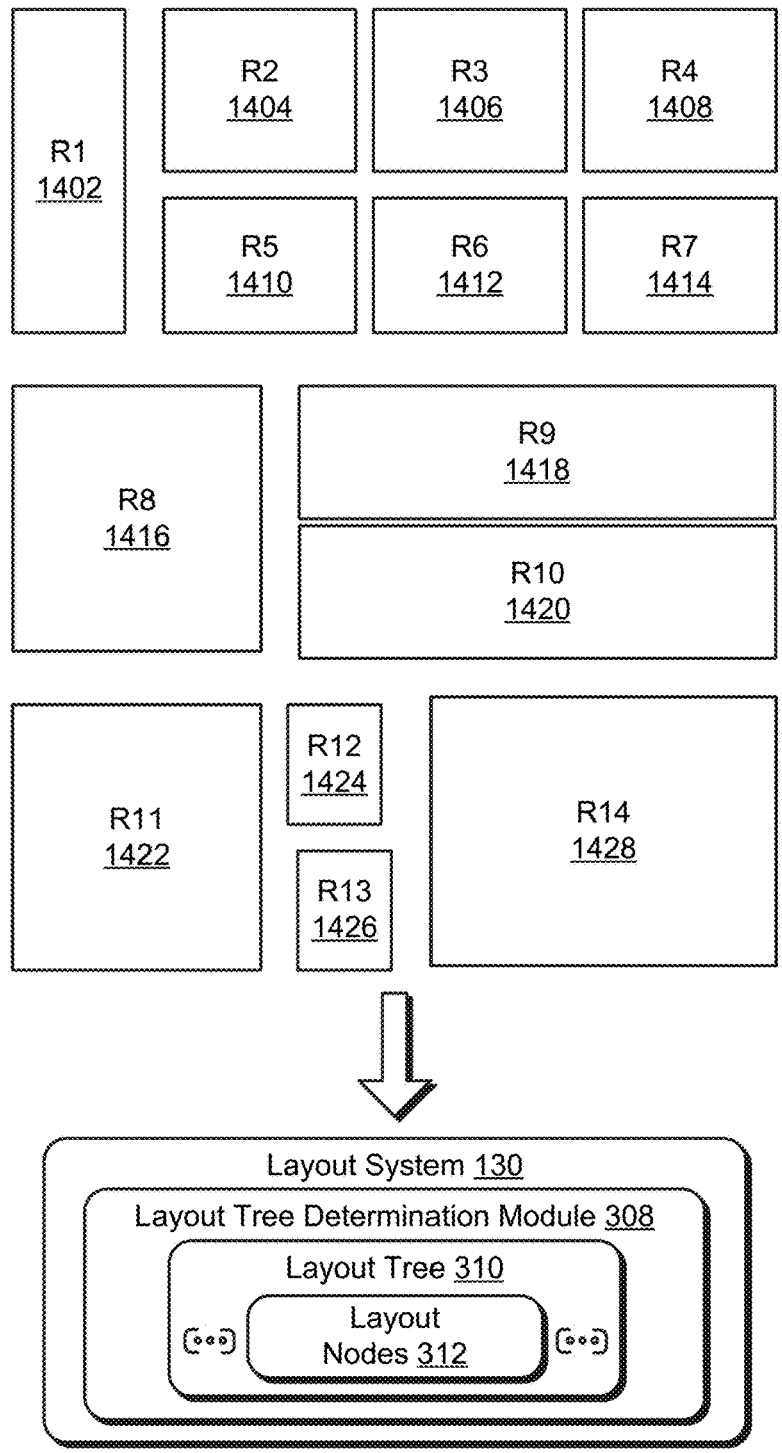
FIG. 14 depicts an example implementation of generating a layout tree that includes merging and combination layout node techniques.
Figure 15:
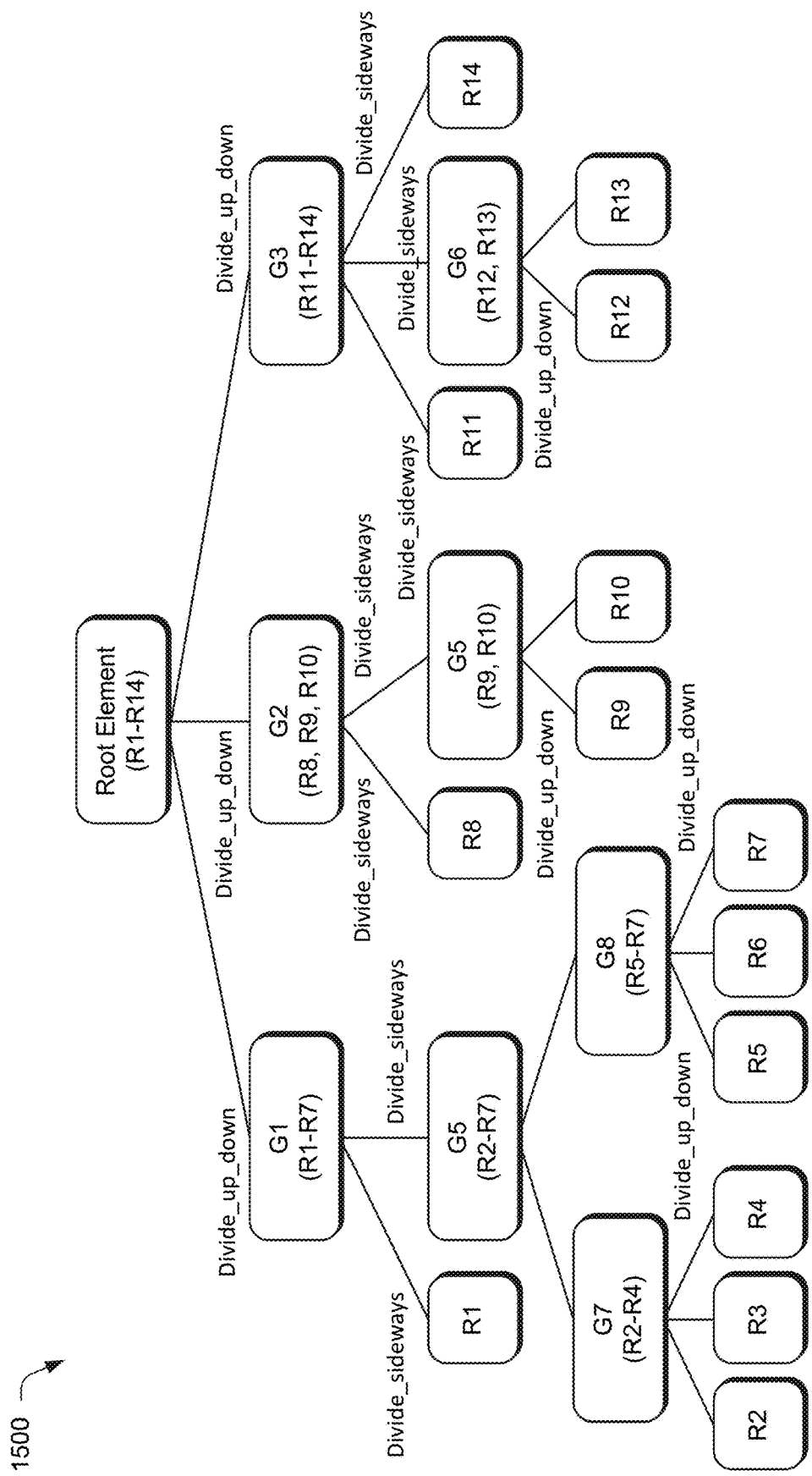
FIG. 15 depicts an example implementation of generating hierarchical groupings of layout rectangles and corresponding items of digital content to form a layout tree.

FIG. 14 depicts an example implementation 1400 of generating a layout tree 310 that includes merging and combination layout node techniques. In this example, the layout tree determination module 308 receives a layout that includes layout rectangles "R1-R14" 1402-1428. To begin, the layout tree determination module 308 employs the "divide_up_down" technique described above to generate a plurality of layout nodes indicating hierarchical groupings of layout rectangles and corresponding items of digital content, an example of which is illustrated in an example implementation 1500 of FIG. 15.

Figure 16:
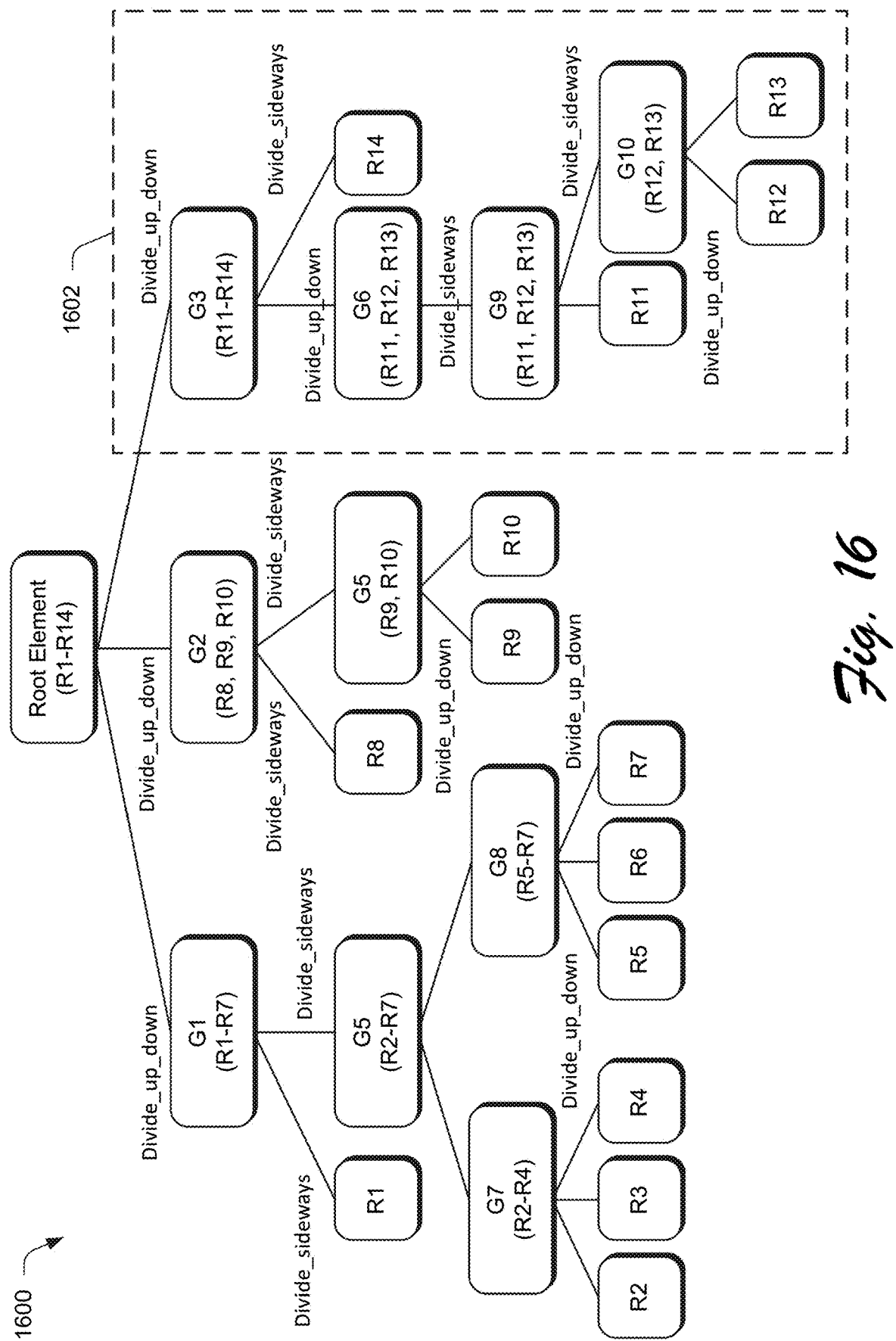
FIG. 16 depicts application of a merge technique to the layout tree of FIG. 15.

The layout tree determination module 308 then employs a merging technique to merge sideways divided layout nodes 312 according to width, i.e., an amount of a display area that is consumed along a primary axis. The layout tree determination module 308 also merges up/down divided layout nodes according to height, i.e., an amount of a display area that is consumed along a secondary axis. A result of this is illustrated in an example implementation 1600 of FIG. 16 in which layout rectangle "R11" and hierarchical grouping "G6" within a branch 1602 of the layout tree are merged as their combined width is less than that of layout rectangle "R14," the widest constituent.

Figure 17:
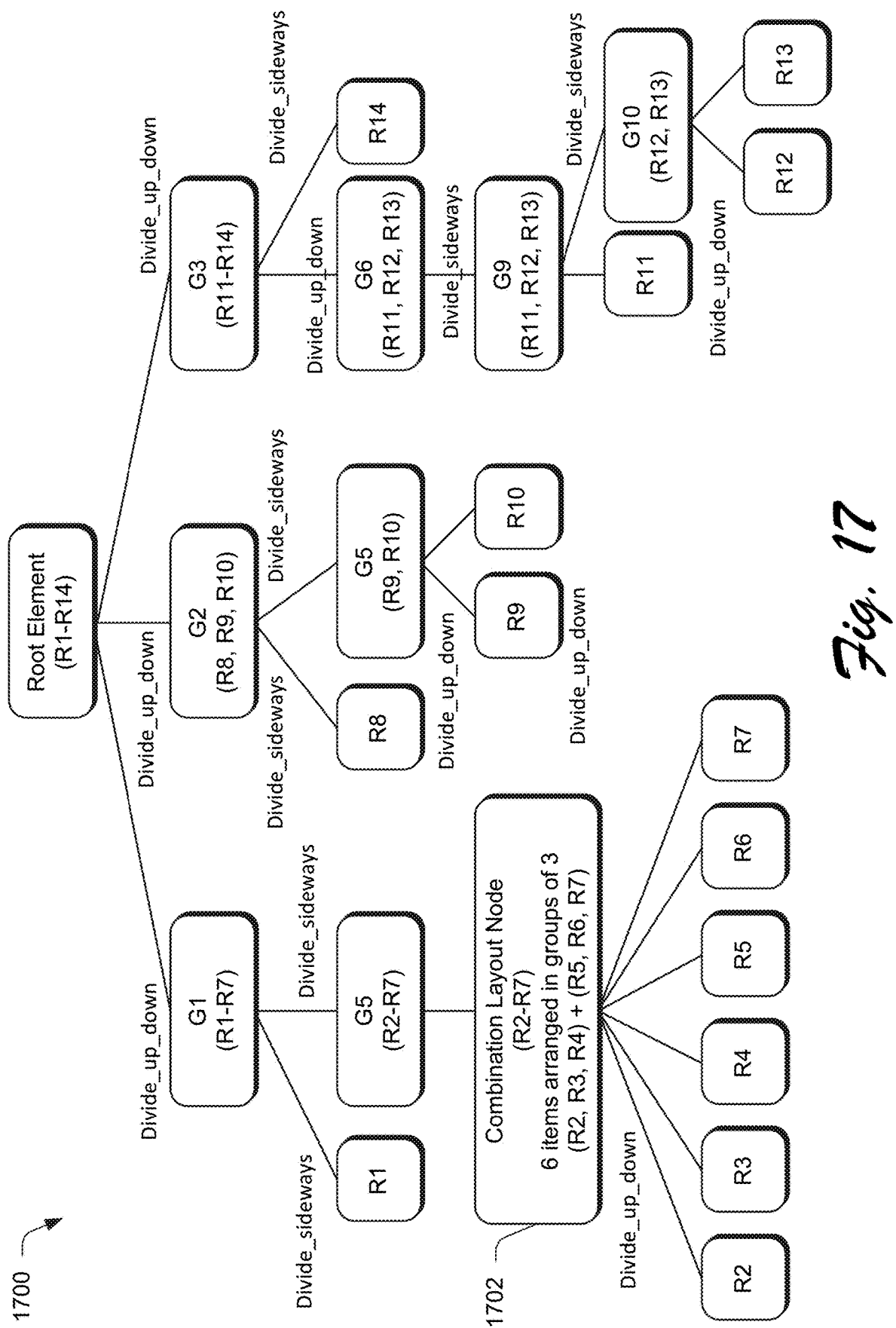
FIG. 17 depicts application of a combination technique to the layout tree of FIG. 15.

As illustrated in the example implementation 1700 of FIG. 17, the layout tree determination module 308 then observes that among the up/down divided groups, "G7" and "G8" are similar in that both groupings includes a similar number of elements "n" and a respective group width is distributed generally equally among the elements. Accordingly, the layout tree determination module 308 combines groupings "G7" and "G8" to form a combination layout node 1702. The layout tree determination module 308 may also mark combination of the layout rectangles R9 and R10 as a combination layout node, but with a single element in each group that does not benefit further when layout decisions are made. Hence, layout nodes that have a single element are not merged in this step. In other words, grounds deduced using divide_up_down technique are merged with sibling groups that are similar in nature with one another, solely. In the illustrated example, the possibility that fits these parameters is "G7" and "G8."

Figure 18:
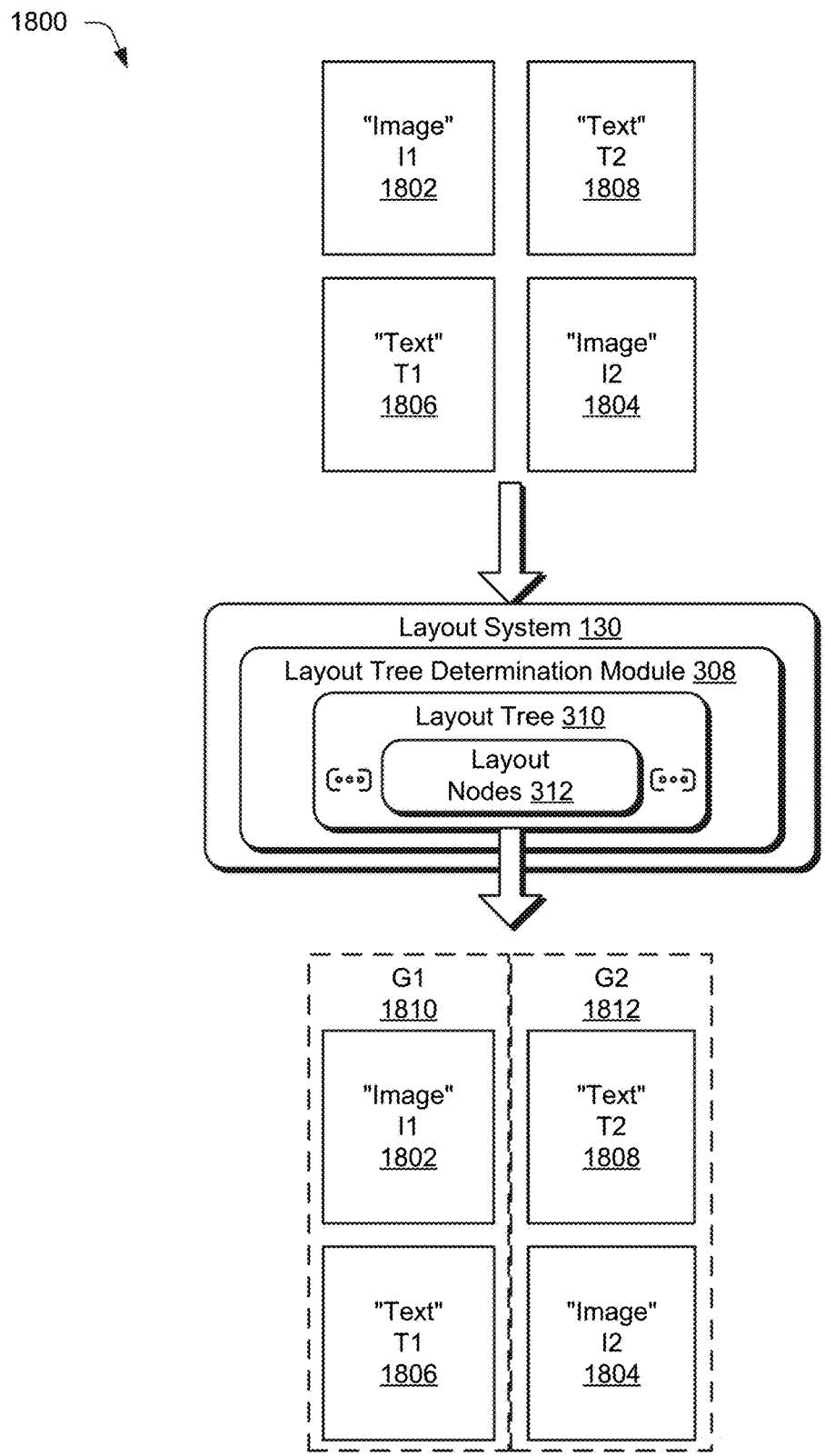
FIG. 18 depicts an example implementation in which a layout tree determination module of FIG. 3 employs content intelligence to generate a layout tree based on content included in respective layout rectangles.

FIG. 18 depicts an example implementation 1800 in which the layout tree determination module 308 employs content intelligence to generate the layout tree 310 based on content included in respective layout rectangles. In this example, content intelligence is employed to determine "what" is included within respective layout rectangles. This may then be used to define relationships between the layout rectangles that may be used to form hierarchical groupings. This may be performed in a variety of ways, such as to employ a keyword extraction system to associate text with images, e.g., based on tags associated with the images, object recognition using machine learning, and so forth.

In the illustrated example, layout rectangles "I1" and "I2" 1802, 1804 include digital images and layout rectangles "T1" and "T2" 1806, 1808 include text, respectively. A determination is made by comparing the text with tags or objects extracted from the digital images that layout box "I1" 1802 corresponds with layout box "T1" 1806 and layout box "I2" 1804 corresponds with layout box "T2" 1808. Accordingly, hierarchical groupings are formed such that grouping "G1" 1810 includes layout rectangles "I1" and "T1" 1802, 1806 and grouping "G2" includes layout rectangles "I2" and "T2" 1804, 1808.

Return will now be made again to the system 300 of FIG. 3, once the layout tree 310 is generated as having layout nodes 312 that have hierarchical groupings of layout rectangles 306 for items of digital content 120, a decision tree generation module 314 is employed to generate a decision tree 316 having a set of rules that are used to control arrangement of the items of digital content within the groupings. This may include whether to employ a side-by-side technique or an up/down technique.

The decision tree generation module 314, for example, generates the decision tree 316 based on the layout tree 310. The decision tree 316 includes a set of rules based on an available display area in a user interface along the primary axis and the secondary axis (block 408). To do so, the decision tree generation module 314 first determines an amount of display area along the primary axis that is used to generate the layout, e.g., a design width along a horizontal axis which is referred to as "W-design."

If a layout node 312 has children that are divided along the primary axis, e.g., sideways such as for "G3" in the previous example, the rule to divide sideways has already been determined. The decision tree generation module 314, for instance, generates a rule that for a screen size wider or equal to "W_design," the children for this node are arranged according to a side-to-side technique. Similarly, if a layout node 312 has children that are divided along a secondary axis, e.g., up/down for "G5" in the illustrated example, for an amount of display area along the primary axis wider or equal to "W_design," the children for this node are also arranged as following the up/down technique. For each combination node, for a screen size wider or equal to "W_design," corresponding items of digital content remain combined in a same number as determined in a previous step.

The decision tree generation module 314 then determine a total amount of display area consumed by each node along the primary and secondary axes, e.g., a total height and width. If a layout node's children are divided sideways then its width is a sum of each of the items of digital content and the height is a maximum height of a tallest item of digital content. Similarly, the decision tree generation module 314 determines a height and width for a layout node 312 having children arranged using an up/down technique.

For example, let the width and height at each hierarchical grouping within the layout nodes 312 be "G_W_i" and "G_H_i". For combination layout nodes, the decision tree generation module 314 calculates a total height and width as well, with the height of a combination layout node having "N" items of digital content divided into "M" groupings defined as a sum of "Hi", "i=1 . . . M", where "Hi" is the height of the "ith" grouping in the combination layout node, and width is a maximum of "Wi", "i=1 M" where "Wi" is the width of the "ith" grouping in the combination layout node. Each grouping in a combination layout node has a width and height computed in the same manner as a node having respective children divided using a side-to-side technique.

For the "ith" grouping which is not a combination node: "i=1 . . . N", let the number of children for the grouping be represented as "C," let the total width of the grouping be represented as "W," and let the total height of the grouping be represented as "H." For a layout node 312 at a largest amount of display area along the primary axis in which the children are arranged side-to-side and "C" is an odd number, at an amount of display area that is less than or equal to "W*1.3/C", the layout tree determination module 308 sets a rule to switch to an up/down technique to arrange the children.

For a layout node 312 at a largest amount of display area along the primary axis in which the children are arranged side-to-side and "C" is an even number, at an amount of display area that is less than or equal to "W*1.3/C", the layout tree determination module 308 sets a rule to switch to an up/down technique to arrange the children but in two groupings of "C/2." For each of these groupings, the same technique is also employed by the layout tree determination module 308 while also taking into account a number of times of digital content included and in the respective grouping and a corresponding width.

For a layout node 312 having children that are arranged according to an up/down technique and "H>W," and the parent grouping for this grouping has children arranged accordingly to a side-by-side techniques and switches to an up/down technique at screen size "S," then at screen size that is less than or equal to "S" a switch is made to a side-by-side technique. The decision tree generation module 314 again follows the same technique above using this newly formed grouping as having a side-by-side technique to determine at which screen width it again switches back to an up/down technique.

For each layout node 312 that is a combination layout node, a number of items of digital content included as part of the node is represented as "N" as arranged in groups of "G" at a maximum amount of display area along the primary axis, e.g., horizontal axis as described using width. Let the width for this combination layout node be represented as "W." Accordingly, a combination layout node is spread over "N/G" rows at a maximum size along the primary axis, e.g., widest screen size. For each value between "N/G to N," the decision tree generation module 314 is configured to determine each of the values, by which, "N" is divisible. For one such value "V," at screen width "W*1.3/G*N/V," the decision tree generation module 314 generates a rule to switch to an arrangement of this combination layout node in groups of "N/V."

As a result, at each layout node 312 in the layout tree 310 the decision tree generation module 314 generates a rule of a set of rules that are used to control arrangement of respective items of digital content based on an amount of available display area along the primary axis, e.g., horizontally, thereby forming the decision tree 316. For example, each rule defines a decision at each layout node 312 having a grouping of items of digital content as follows:

[(screen-size-1, mode1), (screen-size-2, mode2) . . . ]
where screen-size-1>screen-size-(i+1). The rule defining a decision at each combination layout node in the decision tree 316 may be represented as follows:

[(screen_size_1, combo_group_number__1 . . . ]

Figure 19:
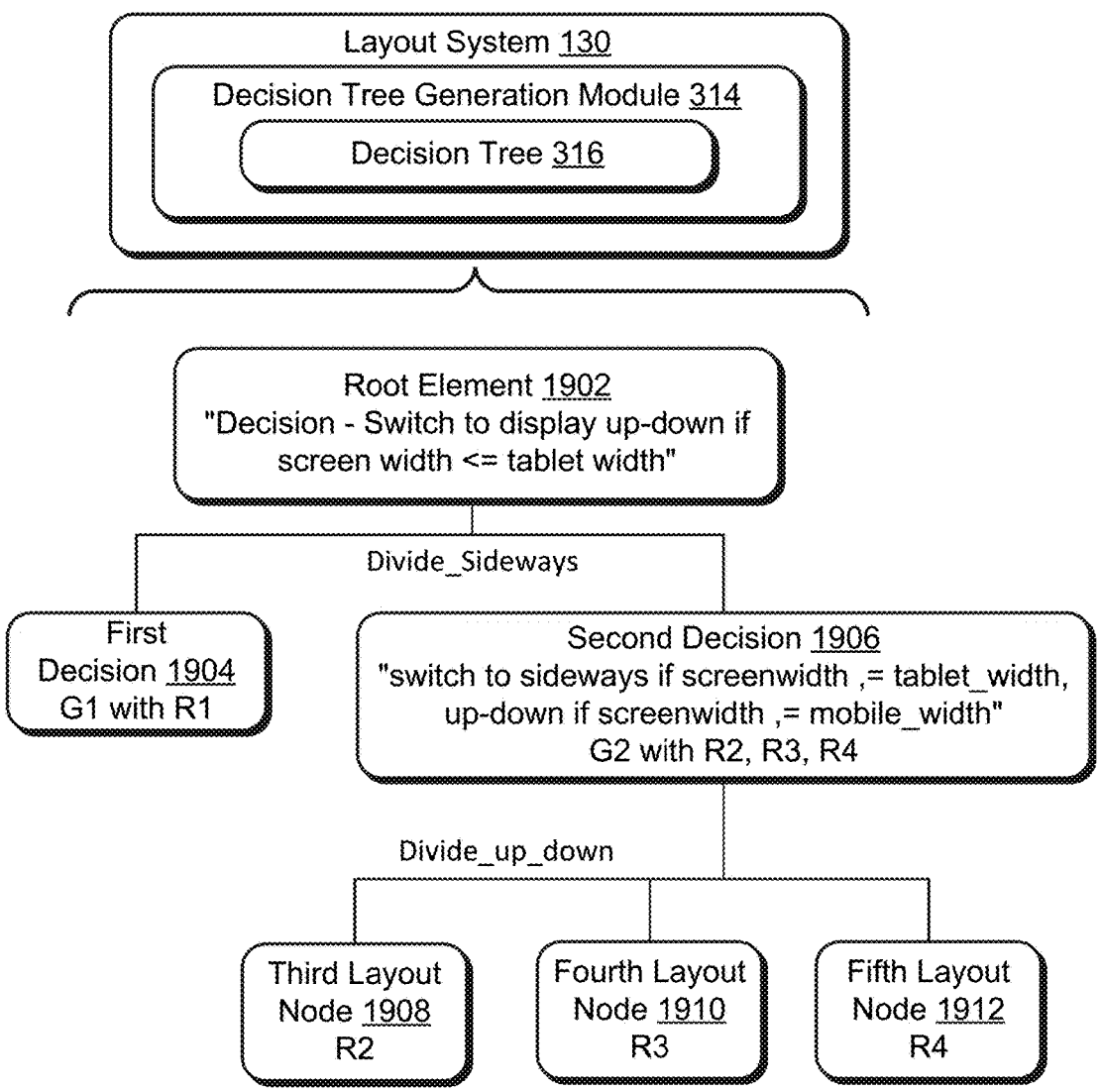
FIG. 19 depicts an example implementation of generation of a decision tree based on a layout tree generated from layout rectangles of FIG. 6.

FIG. 19 depicts an example implementation 1900 of generation of a decision tree 316 based on a layout tree generated from the layout rectangles 604, 606, 608, 610 of FIG. 6. The decision tree 316 generated by the decision tree generation module 314 includes a plurality of layout nodes 1902-1912 with rules defining a decision made to control arrangement of items of digital content associated with the nodes. In this way, the decision tree 316 may respond to a variety of different amounts of available display area to display items of digital content.

Figure 20:
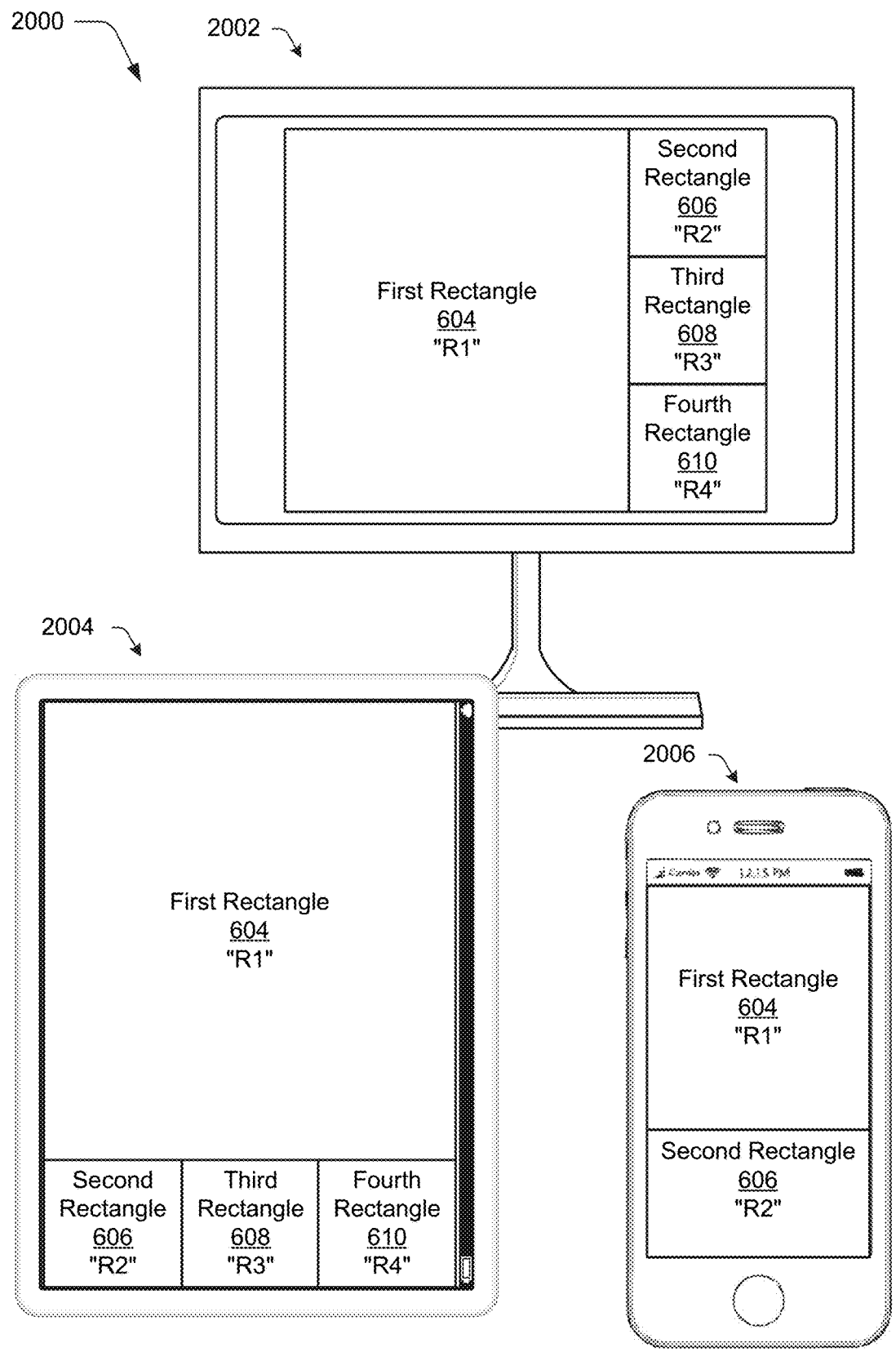
FIG. 20 depicts an example implementation of rendering of items of digital content of FIG. 19 based on a decision tree for a desktop configuration, a tablet configuration, and a mobile configuration.

FIG. 20 depicts an example implementation 2000 of rendering of the items of digital content of FIG. 19 based on the decision tree 316 for a desktop configuration 2002, a tablet configuration 2004, and a mobile configuration 2006. As illustrated, arrangement of the items of digital content may automatically adjust based on the amount of display area available to have a consistent look-and-field with an original design without requiring manual creation by a creative professional of each of these layouts as in conventional techniques.

Return will now be made again to FIG. 3, the decision tree 316 is then converted by a layout definition generation module 318 into a layout definition 132 (block 410) that is targeted for an output medium, via which, the digital content design 116 is to be consumed. The layout definition generation module 318 is configured to convert layout nodes 312 within a tree structure within the decision tree 316 into a markup language, such as XML, HTML, and so forth. For each layout nodes 312, a "div" element is generated along with a set of rules configured as cascading style sheet (CSS) information usable in media queries.

In another example, the layout definition 312 is configured to generate a plurality of fixed layouts for each decision point at each layout node 312 in the decision tree 316. In such a scenario, there results in generation of "N1*N2 . . . Nm" layouts, each for a respective digital content design 116 generated as "Ni" representing a number of decision points at node "I," where "I" varies from "1, 2, . . . m." However, this number may be described as the number of layout nodes 312 closer to the root element in this layout tree 310 tend to switch to an up/down technique followed by layout nodes 312 that are closer to leaf layout nodes 312, i.e., contain individual items of digital content. This may be thought of as following pouring the layout through a series of funnels, each having a decreasing width allowance, to arrange items of digital content such that it passes through the funnel.

By using a markup language such as HTML along with CSS given the tree structure and set of rules of the decision tree 316, this structure is representative of a markup language structure. This markup language structure is usable as a layout definition 132 to control arrangement of items of digital content based on amounts of display area along a primary axis (e.g., horizontal) as represented by CSS media query break points. Accordingly, use of side-by-side and up/down arrangement techniques is controllable through use of a CSS property "width" as part of the layout definition 132.

For example, consider a single node with two types of digital content that are arranged using a side-by-side technique and have a total width divided amount them in X:Y ratio. Accordingly, a CSS of the layout definition 132 may be defined as "X/(X+Y)*100%." Therefore, when using an up/down arrangement technique along a primary axis of width, to use 100% for each of the items of digital content and take a full width of a parent layout node 312, thus being display using an up/down technique without affecting other parts of the digital content design 116. This technique may be applied to any number of items of digital content within respective nodes.

Figure 21:
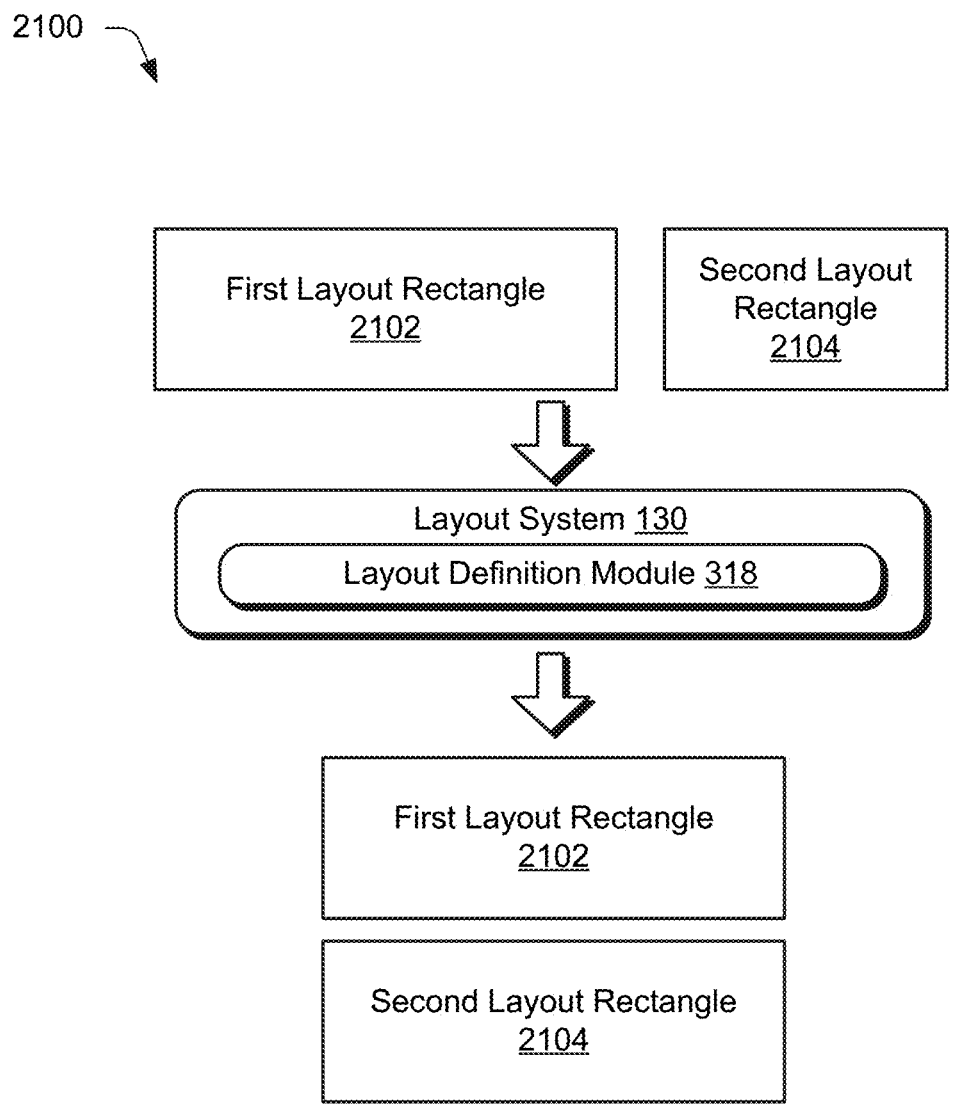
FIG. 21 depicts an example implementation in which a layout definition generation module of FIG. 3 accounts for a gap between items of digital content included within a respective layout node with respect to both primary and secondary axes.

FIG. 21 depicts an example implementation 2100 in which the layout definition generation module 318 takes into account a gap between items of digital content included within a respective layout node 312 with respect to both primary and secondary axes. In this example, when first and second layout rectangles 2102, 2104 are rearranged from a side-by-side technique to an up/down technique, the rectangles are aligned while retaining on overall height to width ratio, respectively, as illustrated when a "width:100%" CSS property is applied. If the layout rectangle includes text, the ratio may be altered.

Figure 22:
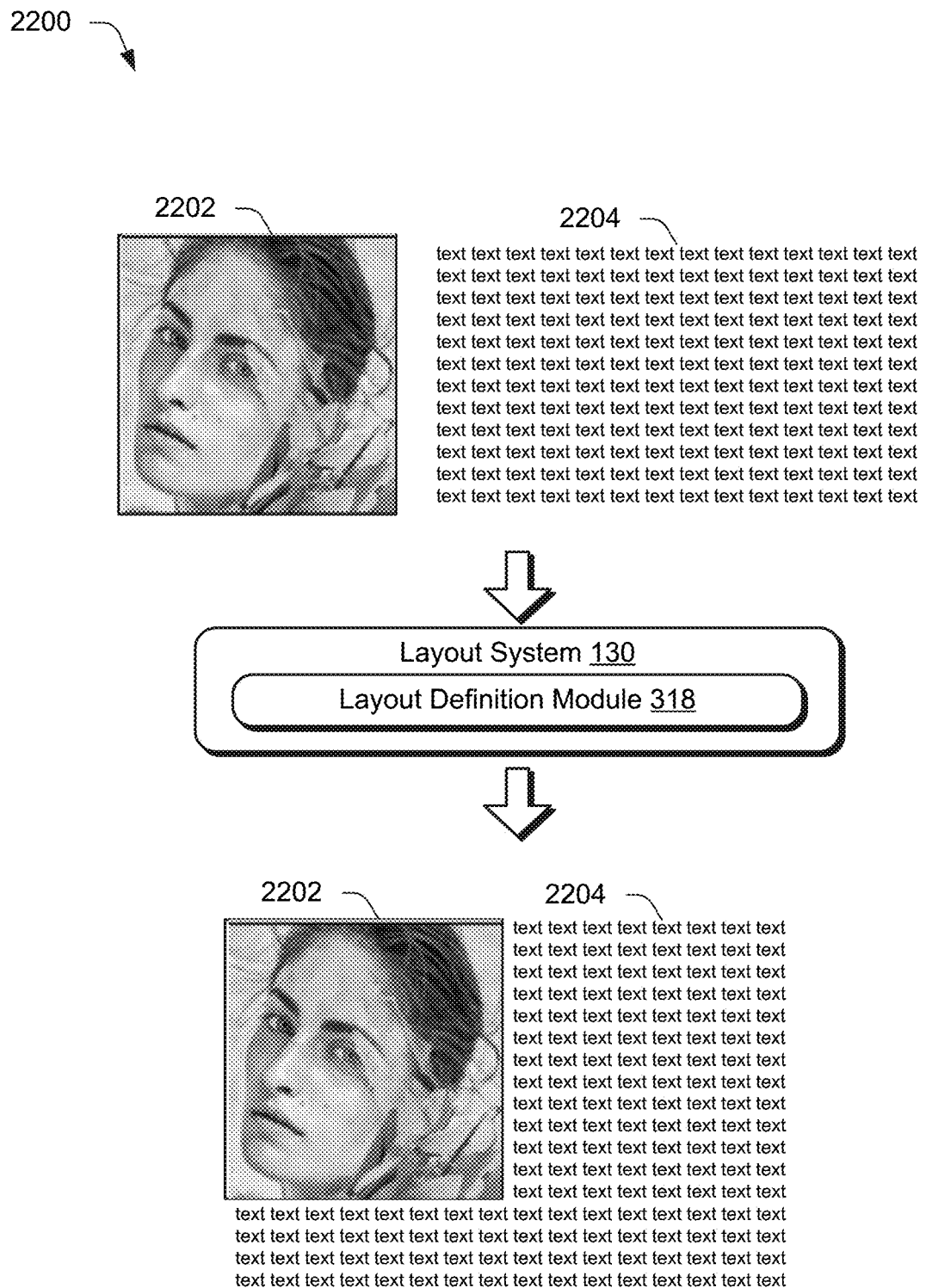
FIG. 22 depicts an example implementation in which a layout definition generation module of FIG. 3 employs a float property for layout rectangles that include text.

FIG. 22 depicts an example implementation 2200 in which the layout definition generation module 318 employs a float property for layout rectangles that include text. In some instances, a layout rectangle 2202 that includes a digital image may be positioned adjacent (e.g., using a side-to-side technique) to a corresponding layout rectangle 2204 that includes take. Accordingly, at a certain break point in available display area this will cause a switch to an up/down technique.

However, in some instances a screen size (e.g., amount of display area available along a primary axis) may be encountered in which a side-to-side display generates a layout having a significant amount of empty space below the layout rectangle 2202 having the digital image. This is caused by extending the text in the layout rectangle 2204 below as a single column. To counter this in the illustrated example, the layout definition module 318 may incorporate a CSS property "float:left" or "float:right" such that the text of layout rectangle 2204 wraps below layout rectangle 2202 having the digital image. In this way, an amount of area in a display device usable to display digital content as part of the digital content design may be conserved.

Similarity, when switching from a side-to-side technique to an up/down technique, a height ratio of items of digital content included within the node is used to determine a percentage along the primary axis (e.g., a width percentage) each item is to take. For example, if two items of digital content in an up/down arrangement technique has a height ratio of "X:Y", then when switching to a side-by-side arrangement technique, "width:(X+Y)*100%) for the first item of digital content and "Y/(X+Y)*100%) for the second item of digital content. A variety of other examples are also contemplated.

Returning back to FIG. 3, from this a digital content design is generated that includes the items of digital content and the layout definition usable to control arrangement of the hierarchical groupings of the items of digital content based on available display area in the user interface (block 412). As a result, the automated digital content layout systems and techniques described herein overcome the challenges of conventional techniques to generate a "design once" digital content design 116 that is usable across a wide range of computing device configurations. These techniques and systems support increased computational efficiency of a computing device and well as increased user efficiency in interacting with the computing device that incorporates these techniques. Accordingly, these techniques and systems overcome limitations of conventional techniques by addressing differences in how a digital content design may be displayed by a wide range of computing device configurations automatically and without user intervention both in creation and use of the design as further described in the following example.

Figure 23:
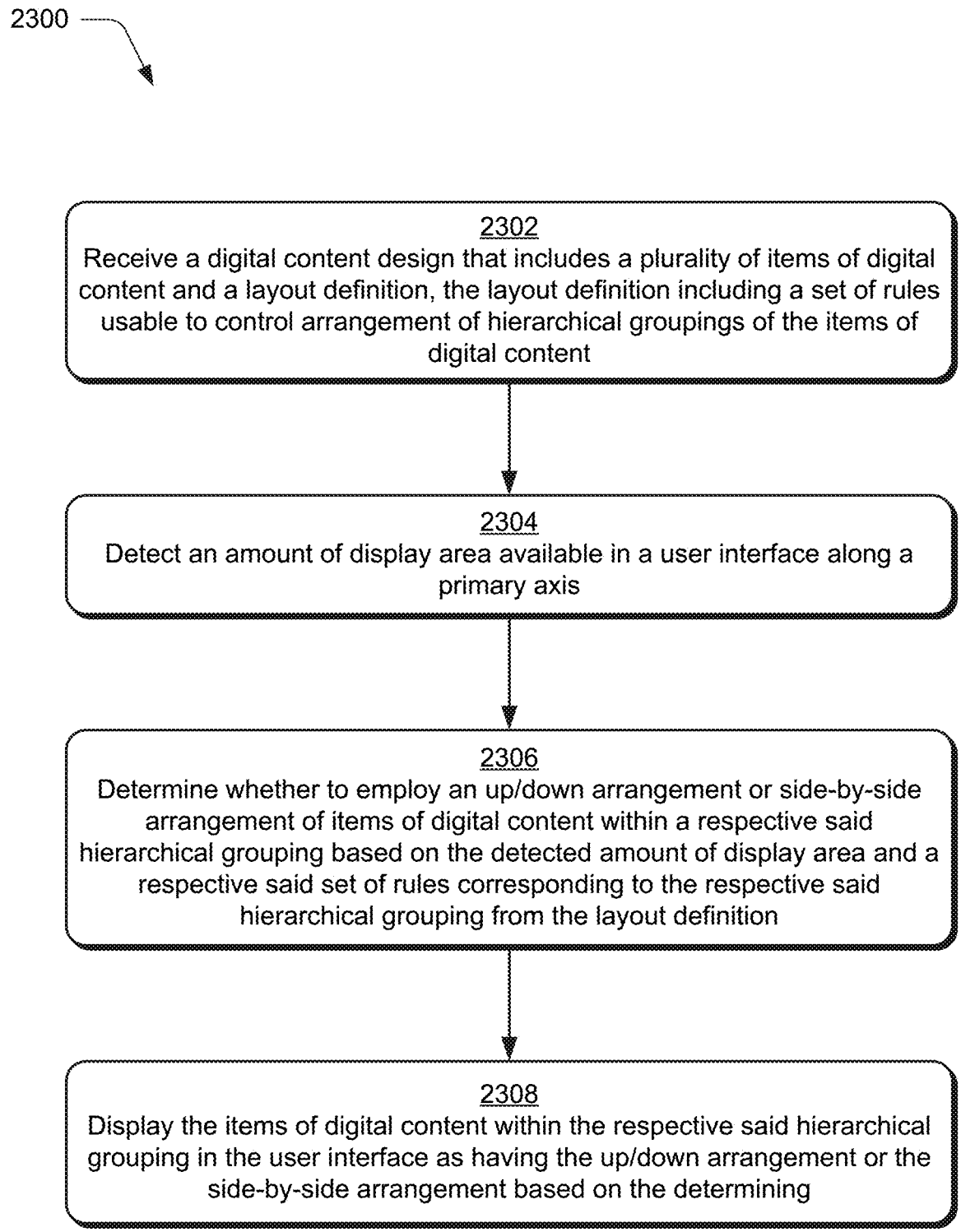
FIG. 23 depicts a procedure in an example implementation of rendering of a digital content design to control arrangement of items of digital content within the design based on a layout definition of FIG. 3.

FIG. 23 depicts a procedure 2300 in an example implementation of rendering of the digital content design 116 to control arrangement of items of digital content within the design based on a layout definition 132 of FIG. 3. A digital content design 116 is received that includes a plurality of items of digital content 120 and a layout definition 132. The layout definition 132 includes a set of rules usable to control arrangement of hierarchical groupings of the items of digital content 120 (block 2302).

A communication module 108 of a computing device 104, for instance, detects an amount of display area available in a user interface 110 of a display device 112 along a primary axis (block 2304), e.g., a horizontal axis. A determination is then made as whether to employ an up/down arrangement or side-by-side arrangement of items of digital content within a respective hierarchical grouping of the digital content design 116 based on the detected amount of display area and a respective set of rules corresponding to the respective said hierarchical grouping from the layout definition 132 (block 2306). The items of digital content are displayed within the respective hierarchical grouping in the user interface 110 as having the up/down arrangement or the side-by-side arrangement based on the determination (block 2308).

Example System and Device

Figure 24:
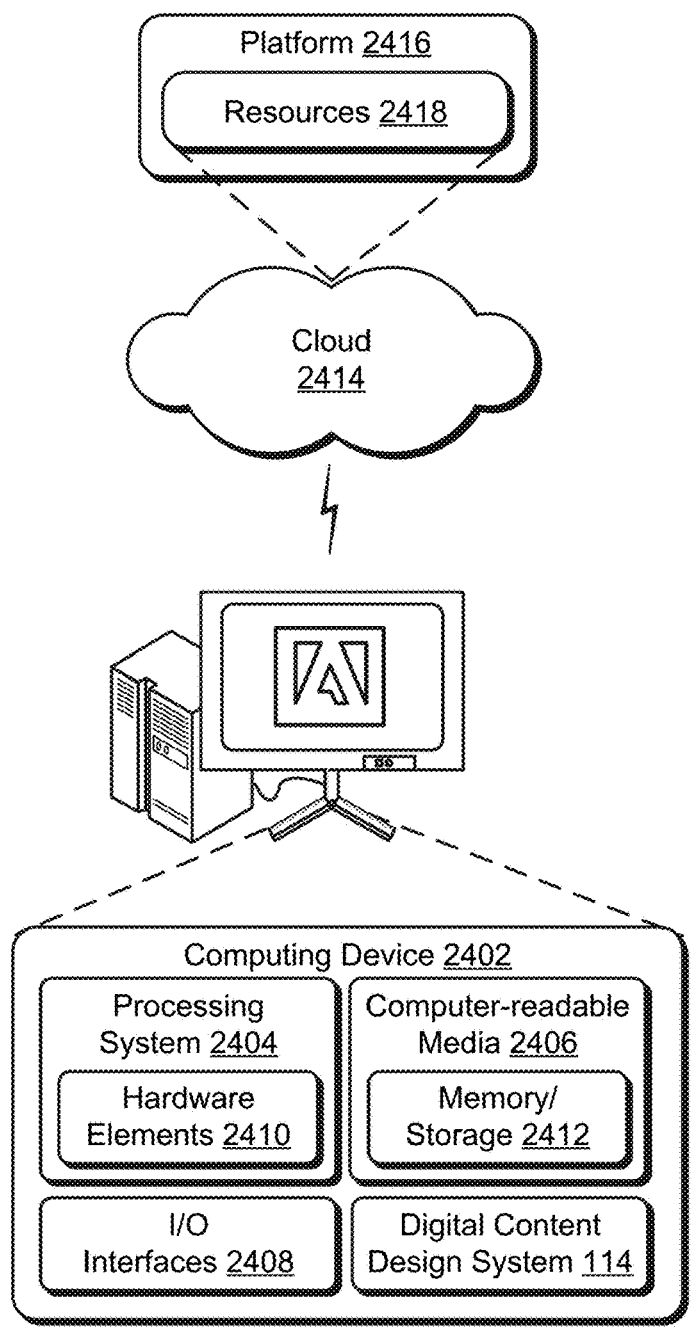
FIG. 24 illustrates an example system including various components of an example device that can be implemented as any type of computing device as described and/or utilize with reference to FIGS. 1-23 to implement embodiments of the techniques described herein.

FIG. 24 illustrates an example system generally at 2400 that includes an example computing device 2402 that is representative of one or more computing systems and/or devices that may implement the various techniques described herein. This is illustrated through inclusion of the digital content design system 114. The computing device 2402 may be, for example, a server of a service provider, a device associated with a client (e.g., a client device), an on-chip system, and/or any other suitable computing device or computing system.

The example computing device 2402 as illustrated includes a processing system 2404, one or more computer-readable media 2406, and one or more I/O interface 2408 that are communicatively coupled, one to another. Although not shown, the computing device 2402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2404 is representative of functionality to perform one or more operations using hardware. Accordingly, the processing system 2404 is illustrated as including hardware element 2410 that may be configured as processors, functional blocks, and so forth. This may include implementation in hardware as an application specific integrated circuit or other logic device formed using one or more semiconductors. The hardware elements 2410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2406 is illustrated as including memory/storage 2412. The memory/storage 2412 represents memory/storage capacity associated with one or more computer-readable media. The memory/storage component 2412 may include volatile media (such as random access memory (RAM)) and/or nonvolatile media (such as read only memory (ROM), Flash memory, optical disks, magnetic disks, and so forth). The memory/storage component 2412 may include fixed media (e.g., RAM, ROM, a fixed hard drive, and so on) as well as removable media (e.g., Flash memory, a removable hard drive, an optical disc, and so forth). The computer-readable media 2406 may be configured in a variety of other ways as further described below.

Input/output interface(s) 2408 are representative of functionality to allow a user to enter commands and information to computing device 2402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2410 and computer-readable media 2406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2410. The computing device 2402 may be configured to implement particular instructions and/or functions corresponding to the software and/or hardware modules. Accordingly, implementation of a module that is executable by the computing device 2402 as software may be achieved at least partially in hardware, e.g., through use of computer-readable storage media and/or hardware elements 2410 of the processing system 2404. The instructions and/or functions may be executable/operable by one or more articles of manufacture (for example, one or more computing devices 2402 and/or processing systems 2404) to implement techniques, modules, and examples described herein.

The techniques described herein may be supported by various configurations of the computing device 2402 and are not limited to the specific examples of the techniques described herein. This functionality may also be implemented all or in part through use of a distributed system, such as over a "cloud" 2414 via a platform 2416 as described below.

The cloud 2414 includes and/or is representative of a platform 2416 for resources 2418. The platform 2416 abstracts underlying functionality of hardware (e.g., servers) and software resources of the cloud 2414. The resources 2418 may include applications and/or data that can be utilized while computer processing is executed on servers that are remote from the computing device 2402. Resources 2418 can also include services provided over the Internet and/or through a subscriber network, such as a cellular or Wi-Fi network.

The platform 2416 may abstract resources and functions to connect the computing device 2402 with other computing devices. The platform 2416 may also serve to abstract scaling of resources to provide a corresponding level of scale to encountered demand for the resources 2418 that are implemented via the platform 2416. Accordingly, in an interconnected device embodiment, implementation of functionality described herein may be distributed throughout the system 2400. For example, the functionality may be implemented in part on the computing device 2402 as well as via the platform 2416 that abstracts the functionality of the cloud 2414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital content design creation environment, a method implemented by a computing device, the method comprising:
    receiving, by the computing device, a single digital content design having single instances, respectively, of items of digital content that are displayable as part of the single digital content design;
    determining, by the computing device, a layout of the items of digital content with respect to each other within the single digital content design;
    generating, by the computing device, a layout tree having a plurality of layout nodes that describe an arrangement of hierarchical groupings of the items of digital content in the determined layout with respect to primary and secondary axes;
    generating, by the computing device, a decision tree based on the layout tree, the decision tree including a set of rules based on an available display area in a user interface along the primary axis and the secondary axis, the set of rules included in the decision tree specifying an up/down arrangement or a side-to-side arrangement for a portion of the items of digital content within the hierarchical groupings, the up/down arrangement employed when a number of items within the respective said hierarchical grouping is odd, the side-by-side arrangement employed when the number of items within the respective said hierarchical grouping is even;
    converting, by the computing device, the decision tree into a layout definition having the set of rules;
    including, by the computing device, the layout definition having the set of rules as part of the single digital content design that includes the single instances, respectively, of the items of digital content, the set of rules are executable by a subsequent computing device to respond to differences in an available display area of the subsequent computing device to control the up/down arrangement and the side-to-side arrangement for the portion of the single instances of the items of digital content; and
    outputting, the computing device, the single digital content design for receipt by the subsequent computing device, the single digital content design including the single instances of the items of digital content and the set of rules.

2. The method as described in claim 1, wherein the secondary axis is perpendicular to the primary axis.

3. The method as described in claim 2, wherein the primary axis is a horizontal axis in the user interface and the secondary axis is a vertical axis in the user interface.

4. The method as described in claim 1, wherein the layout definition is usable to control the arrangement of the hierarchical groupings of the items of digital content based on the available display area in the user interface initially with respect to the primary axis and then with respect to the secondary axis.

5. The method as described in claim 1, further comprising generating a plurality of layout rectangles by merging collections of bounding boxes having overlapping areas and wherein the generating of the layout tree is based on an arrangement of the plurality of layout rectangles.

6. The method as described in claim 5, further comprising determining the bounding boxes by:
    fitting borders to the items of digital content;
    adding padding around the borders of non-rectangular ones of the items of digital content; and
    fitting the bounding boxes to encompass the padding.

7. The method as described in claim 1, wherein the generating of the decision tree is based on respective amounts of the available display area in the user interface that are consumed by respective said hierarchical groupings of the items of digital content.

8. The method as described in claim 1, wherein the layout definition is configured according to a markup language or cascading style sheet.

9. The method as described in claim 1, wherein the hierarchical groupings includes at least one grouping of at least a portion of the items of digital content defined initially with respect to the primary axis and then with respect to the secondary axis.

10. The method as described in claim 1, wherein at least one of the hierarchical groupings includes a text item and a digital image grouped together.

11. In a digital medium digital content design rendering environment, a method implemented by a computing device, the method comprising:
    receiving, by the computing device, a single digital content design that includes single instances, respectively, of a plurality of items of digital content and a layout definition including a set of rules included in a decision tree that specify an up/down arrangement or a side-to-side arrangement of the single instances of the items of digital content within hierarchical groupings; and
    controlling, by the computing device, arrangement of the single instances of items of digital content to render the single digital content design by executing the set of rules that are configured to respond to differences in an amount of an available display area in a user interface, the controlling including:
        detecting an amount of display area available in the user interface along a primary axis;
        determining whether to employ the up/down arrangement or the side-by-side arrangement for a portion of the single instances of the items of digital content within the respective said hierarchical grouping based on the amount of display area, the up/down arrangement employed when a number of items within the respective said hierarchical grouping is odd, the side-by-side arrangement employed when the number of items within the respective said hierarchical grouping is even; and
        displaying the portion of the single instances of the items of digital content within the respective said hierarchical grouping in the user interface as having the determined up/down arrangement or the determined side-by-side arrangement.

12. The method as described in claim 11, wherein the primary axis is a horizontal axis in the user interface.

13. The method as described in claim 11, wherein the determining indicates that there is not sufficient room in the user interface along the primary axis for either the up/down arrangement or the side-by-side arrangement of the items of digital content within the respective said hierarchical grouping and further comprising detecting, by the computing device, an amount of display area available in a user interface along the primary axis at a new position along a secondary axis in the user interface.

14. The method as described in claim 13, wherein the primary axis is perpendicular to the secondary axis.

15. The method as described in claim 14, wherein the primary axis is a horizontal axis and the secondary axis is a vertical axis.

16. In a digital content design creation environment, a layout system comprising:
    a layout arrangement module implemented at least partially in hardware of a computing device to;
        receive a single digital content design having single instances, respectively, of items of digital content that are displayable as part of the single digital content design; and
        determine a layout of items of digital content with respect to each other within the single digital content design;
    a layout tree determination module implemented at least partially in hardware of the computing device to determine a layout tree having a plurality of layout nodes that describe an arrangement of hierarchical groupings of the items of digital content in the determined layout with respect to primary and secondary axes;
    a decision tree generation module implemented at least partially in hardware of the computing device to generate a decision tree based on the layout tree, the decision tree including a set of rules based on an available display area in a user interface along the primary axis and then the secondary axis, the set of rules included in the decision tree including at least one said rule specifying an up/down arrangement when a number of items within a respective said hierarchical grouping is odd or a side-to-side arrangement for a portion of the items when a number of items of digital content within the respective said hierarchical grouping is even; and
    a layout definition generation module implemented at least partially in hardware of the computing device to:
        convert the decision tree into a layout definition having the set of rules; and
        include the layout definition in the single digital content design that includes the single instances, respectively, of the items of digital content, the layout definition in which the set of rules are executable by a subsequent computing device to control the up/down arrangement and the side-to-side arrangement of the portion of the single instances of the items of digital content to respond to differences in an amount of an available display area in a user interface of the subsequent computing device.

17. The layout system as described in claim 16, wherein the secondary axis is perpendicular to the primary axis.

18. The layout system as described in claim 17, wherein the primary axis is a horizontal axis in the user interface and the secondary axis is a vertical axis in the user interface.

19. The layout system as described in claim 16, wherein the layout definition is usable to control the up/down arrangement and the side-to-side arrangement of the items of digital content based on the amount of the available display area in the user interface of the subsequent computing device initially with respect to the primary axis and then with respect to the secondary axis.

20. The layout system as described in claim 16, wherein the layout tree determination module is implemented to:
    generate a plurality of layout rectangles by merging collections of bounding boxes having overlapping areas including to generate at least one layout rectangle of the plurality of layout rectangles by:
  merging two or more of the bounding boxes having overlapping areas to form a merged bounding box; and
  merging the merged bounding box with an additional bounding box that overlaps the merged bounding box and does not overlap the two or more of the bounding boxes to form the at least one layout rectangle; and
determine the layout tree based on the plurality of layout rectangles.

\* \* \* \* \*